US012489480B2

(12) United States Patent
Pezo et al.

(10) Patent No.: US 12,489,480 B2
(45) Date of Patent: Dec. 2, 2025

(54) WIDEBAND RECEIVER WITH INTERFERER REJECTION

(71) Applicant: RAFAEL ADVANCED DEFENSE SYSTEMS LTD., Haifa (IL)

(72) Inventors: David Pezo, Netanya (IL); Eli Yona, Binyamina (IL); Tali Kagan, Kibbutz Usha (IL); Avigdor Brillant, Zichron Yaakov (IL); Rafael Azoulay, Shimshit (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 18/272,602

(22) PCT Filed: Jan. 11, 2022

(86) PCT No.: PCT/IB2022/050182
§ 371 (c)(1),
(2) Date: Jul. 17, 2023

(87) PCT Pub. No.: WO2022/153174
PCT Pub. Date: Jul. 21, 2022

(65) Prior Publication Data
US 2024/0313813 A1   Sep. 19, 2024

(30) Foreign Application Priority Data

Jan. 15, 2021   (IL) .......................................... 280268

(51) Int. Cl.
*H04B 1/10*   (2006.01)
*H04B 1/12*   (2006.01)

(52) U.S. Cl.
CPC ........... *H04B 1/1036* (2013.01); *H04B 1/109* (2013.01); *H04B 1/126* (2013.01)

(58) Field of Classification Search
CPC ...... H04B 1/123; H04B 15/02; H04B 1/1036; H04B 1/525; H04B 1/71; H04B 1/7101;
(Continued)

(56) References Cited

U.S. PATENT DOCUMENTS 6,512,472 B1   1/2003   Smith
6,724,840 B1   4/2004   Osofsky et al.
(Continued)

FOREIGN PATENT DOCUMENTS

CN   105322976 A   2/2016

OTHER PUBLICATIONS

Sepidband, Paria, and Kamran Entesari. "A CMOS UWB receiver with reconfigurable notch filters for narrow-band interferers." 2017 IEEE Radio Frequency Integrated Circuits Symposium (RFIC). IEEE, 2017.
(Continued)

*Primary Examiner* — Eva Y Puente
(74) *Attorney, Agent, or Firm* — Rivka Friedman

(57) ABSTRACT

A receiver system has at least one antenna that receives a plurality of signals, including a desired signal, across a wide band of frequencies. At least one tunable filter is in signal communication with the at least one antenna, and filters the plurality of signals to produce a plurality of filtered signals. Gain control circuitry is in signal communication with the at least one tunable filter, and produces a gain adjusted version of the filtered signals. A processing unit processes received signals in a portion of the wide band to extract signal characteristics of at least one undesired signal in the portion of the wide band. The at least one tunable filter is tuned based at least in part on the signal characteristics of the at least one undesired signal to maintain the SNR of the desired signal above a threshold level at the output of the gain control circuitry.

20 Claims, 8 Drawing Sheets

(58) Field of Classification Search
CPC .... H04B 1/715; H04B 1/71637; H04B 1/719; H04L 25/03019; H04L 25/03885; H04L 25/03025; H04L 27/38; H04L 27/2647; H04L 2025/03477; H04L 25/03044; H04W 56/001; H04W 84/042; H04W 56/00; H04W 52/362; H04W 80/00; H04W 88/08; H04W 88/10
USPC .......................................................... 375/350
See application file for complete search history.

(56) References Cited

U.S. PATENT DOCUMENTS

| | | | |
|---|---|---|---|
| 8,243,864 B2 | 8/2012 | Ciccarelli et al. | |
| 8,437,722 B2* | 5/2013 | Walley | H04B 1/1638 375/346 |
| 8,655,300 B2 | 2/2014 | Kapoor et al. | |
| 9,042,502 B2 | 5/2015 | Malaga et al. | |
| 9,100,243 B2 | 8/2015 | Ly-Gagnon et al. | |
| 9,807,712 B2 | 10/2017 | Ly-Gagnon et al. | |
| 10,284,244 B1* | 5/2019 | Kulkarni | H04B 1/0064 |
| 10,830,867 B2 | 11/2020 | Lin | |
| 2002/0155812 A1* | 10/2002 | Takada | H04B 1/7101 455/63.1 |
| 2004/0170157 A1* | 9/2004 | Kim | H04B 1/7183 370/349 |
| 2008/0194221 A1* | 8/2008 | Uramoto | H04B 1/1036 455/226.1 |
| 2011/0021168 A1 | 1/2011 | Weissman et al. | |
| 2011/0085625 A1 | 4/2011 | Urakawa et al. | |
| 2012/0147929 A1 | 6/2012 | Malaga et al. | |
| 2013/0031535 A1 | 1/2013 | Ji et al. | |
| 2013/0045705 A1 | 2/2013 | Kapoor et al. | |
| 2013/0052973 A1* | 2/2013 | Mo | H04B 1/006 455/188.1 |
| 2013/0083876 A1 | 4/2013 | Suzuki et al. | |
| 2013/0115904 A1* | 5/2013 | Kapoor | H04B 1/109 455/307 |
| 2013/0315351 A1 | 11/2013 | Yokokawa et al. | |
| 2014/0099908 A1 | 4/2014 | Bornazyan | |
| 2015/0304056 A1 | 10/2015 | Guo et al. | |
| 2017/0359092 A1 | 12/2017 | Dufrene et al. | |
| 2018/0013514 A1 | 1/2018 | Hudson | |
| 2019/0058499 A1 | 2/2019 | Grens | |
| 2019/0260355 A1* | 8/2019 | Khlat | H03H 9/6409 |
| 2020/0018617 A1 | 1/2020 | Cardalda-Garcia et al. | |
| 2020/0186174 A1 | 6/2020 | Lascari et al. | |
| 2022/0209805 A1* | 6/2022 | Yu | H04B 1/0007 |

OTHER PUBLICATIONS

Entesari, Kamran, and Paria Sepidband. "Spectrum sensing: Analog (or partially analog) CMOS real-time spectrum sensing techniques." IEEE Microwave Magazine 20.6 (2019): 51-73.
Pérez et al., "Automatic gain control: techniques and architectures for RF receivers" Springer, 2011, p. 6.
Israeli Office Action for 280268 Mailed on Sep. 13, 2021.
International Search Report for PCT/IB2022/050182 Mailed on Jan. 22, 2022.
Extended European Search Report for EP 22739232.1 Mailed on Jun. 6, 2024.
U.S. Appl. No. 99/066,248, dated Feb. 27, 2018, Deepnarayan Gupta.
Dale N. Hatfield et al., Introduction to Interface Resolution, Enforcement and Radio Ncise, Spectrum/Receiver Performance Working Group, Federal Communications Commission, Technological Advisory Council, Jun. 10, 2014.
Characteristics of ultra-wideband technology, Recommendation ITU-R, SM.1755-0, 2006.
Catherine M. Keller et al. Ultra-Wideband Direct Sampling Receiver, 2007, 10.1109/ICUWB.2007.4380975.
M. Pezzin et al., A Fully Integrated LDR IR-UWB CMOS Transceiver Based on "1.5-bit" Direct Sampling, 642-647. 10.1109/ICUWB.2007.4381023.
Bellabas, Ahcene et al. Ultra-Wideband Direct RF Sampling Transceiver Design. 2023, 10.5220/0012175800003543.
High Speed Variable Gain Amplifiers (VGAs), Analog Devices, MT-073, 209.
AMIR Ghaffari et al., (2012). 8Path tunable RF Notch Filters for Blocker Suppression. American Journal of Physics—AMER J PHYS. 55. 76-78. 10.1109/ISSCC.201.6176936.
Pingyue Song et al., RF Filter Synthesis Based on Passively Coupled N-Path Resonators, 2009, IEEE Journal of Solid-State Curcuits. pp. 1-12. 10.1109/JSSC.2019.2923561.
Ahmed Hamza et al, A Multiband, High-Order, Notch Flter for TX Leakage Suppression in FDD Receivers, 2009, IEEE Solid-State Circuits Letters. 3. 490-493, 10.1109/LSSC.2020.3033183.

* cited by examiner

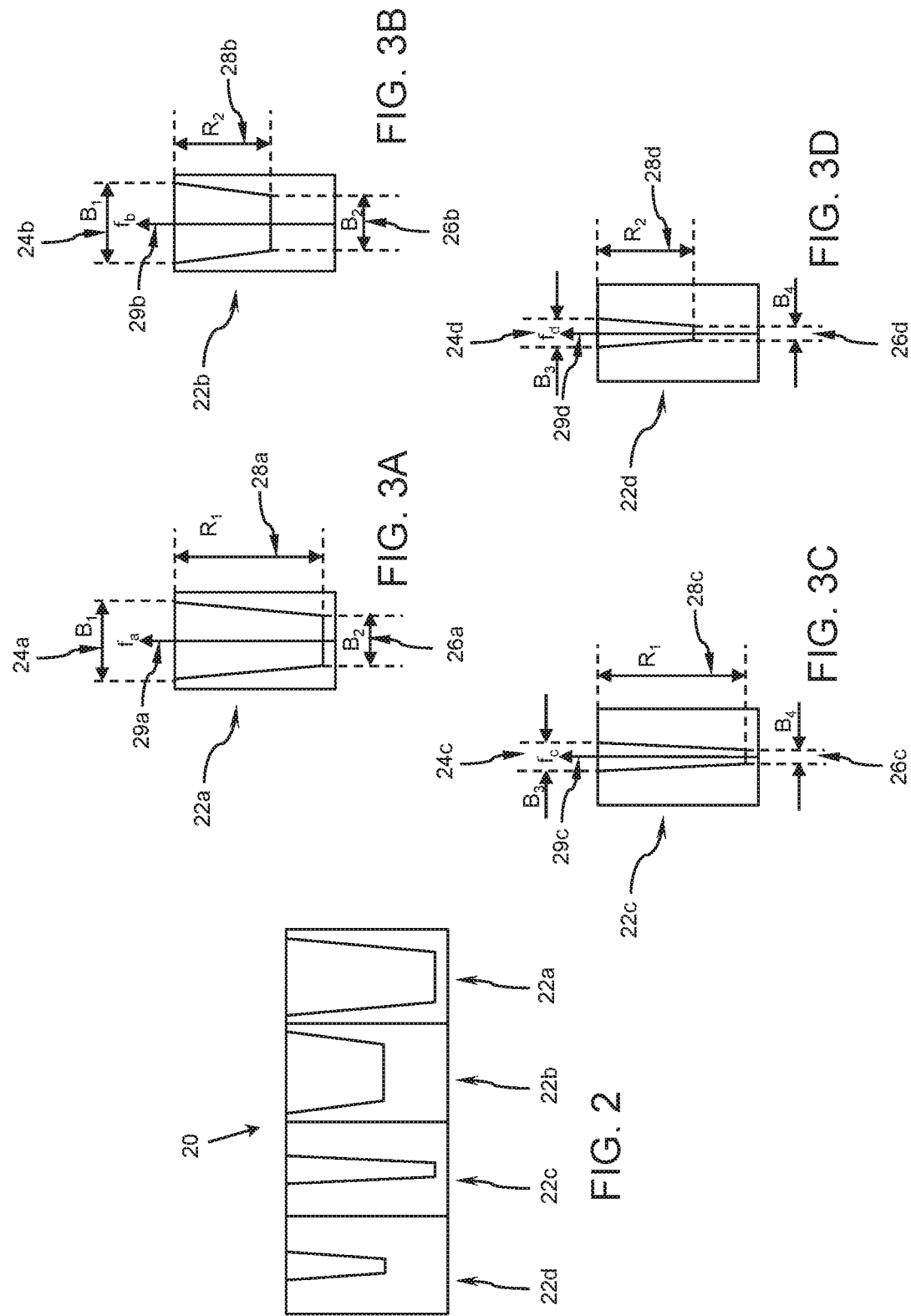

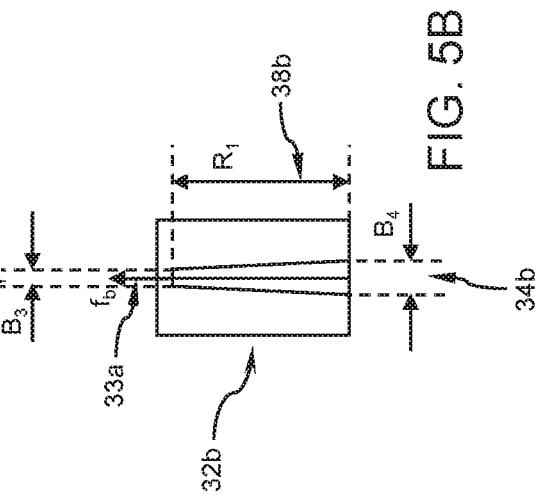
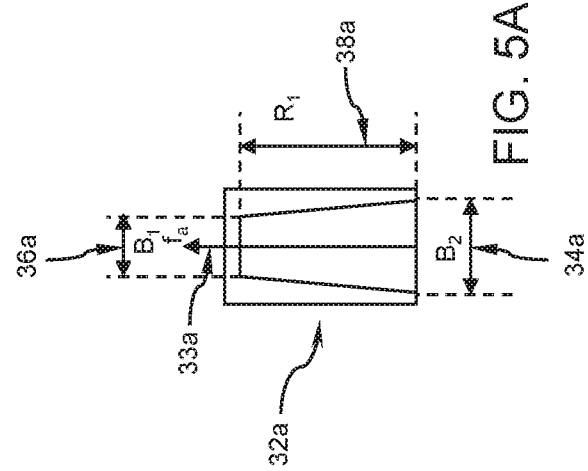
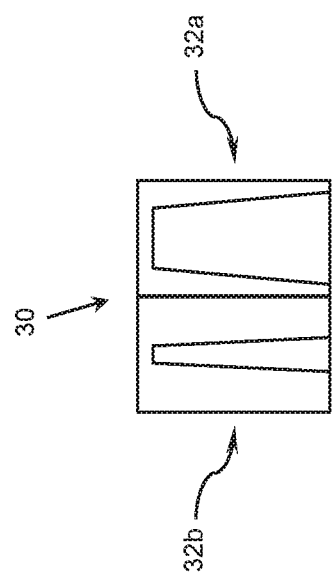
FIG. 5B
FIG. 5A
FIG. 4

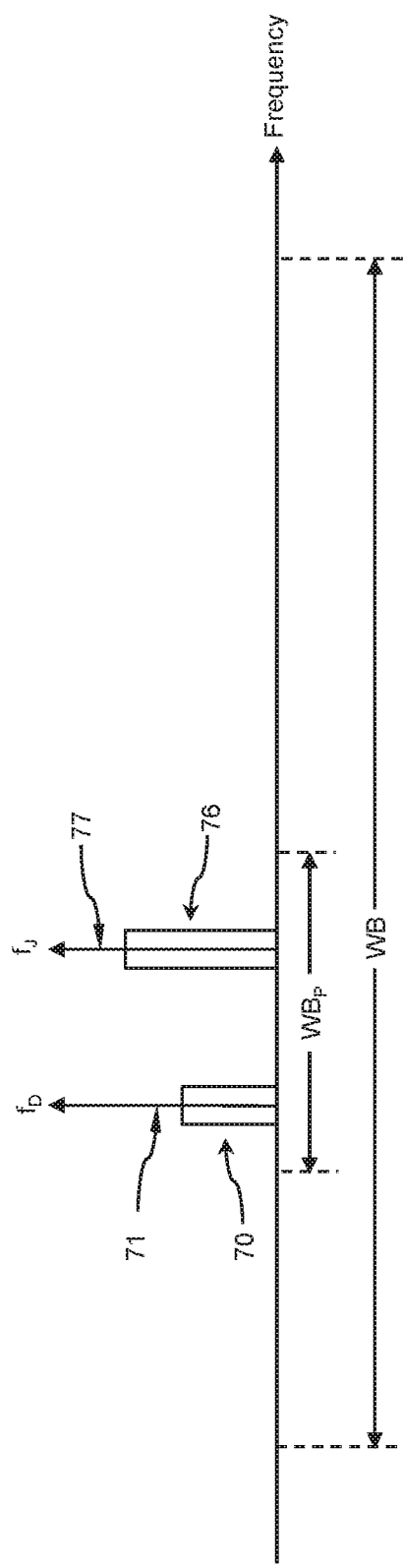
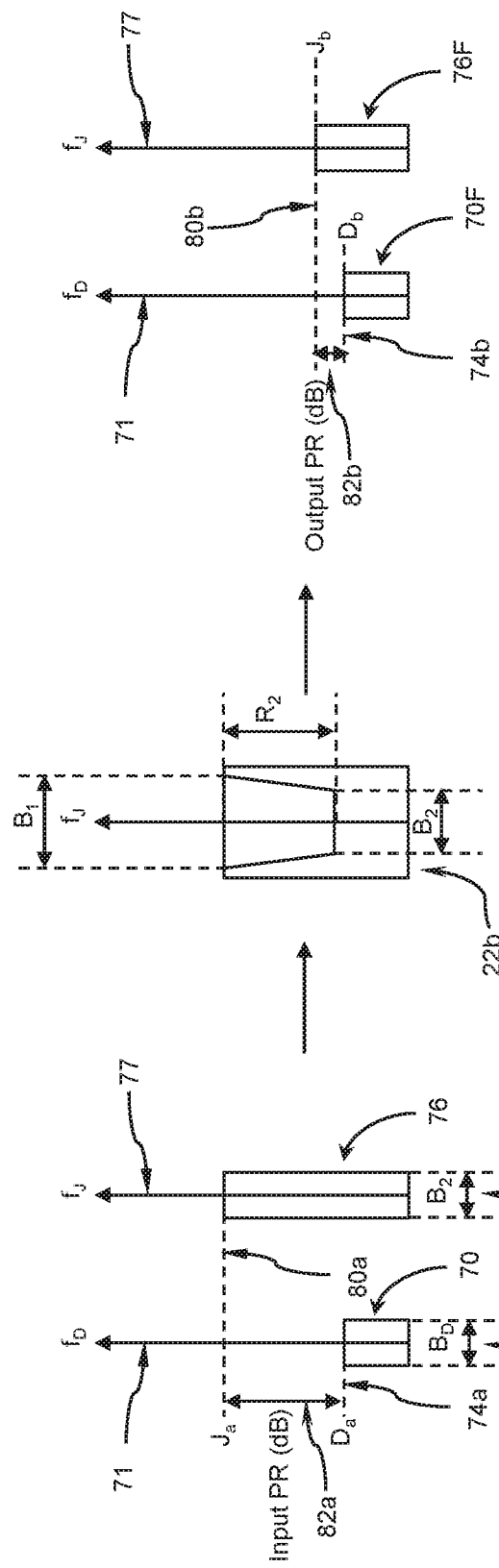
FIG. 6A
FIG. 6B

WIDEBAND RECEIVER WITH INTERFERER REJECTION

TECHNICAL FIELD

The present invention relates to communications systems, and more particularly, to anti-interference techniques for wideband receivers.

BACKGROUND OF THE INVENTION

Radio frequency (RF) receivers are generally known in the art. Conventional RF receivers down convert RF signals received from an antenna to an intermediate frequency (IF) using a mixer prior to digitization by the analog-to-digital converter (ADC) and processing (demodulation and decoding). In wide band receivers, down conversion is avoided and the entire received wide band signal spectrum is digitized and processed. However, by being open to the entire wide band, such receivers are more susceptible to interference signals, for example jammer signals transmitted from hostile actors, thereby increasing the likelihood of scenarios in which a strong interference signal is received together with a weak desired signal. In such scenarios, the signal power of the interference signal may be strong enough to trigger the automatic gain control (AGC) circuitry to attenuate all of the received signals in order to prevent the ADC from reaching full scale. As a consequence, the AGC may reduce the signal power of the desired signal at the ADC input, degrading the signal-to-noise ratio (SNR) or bringing the desired signal amplitude below the noise level, thereby effectively suppressing the desired signal.

SUMMARY OF THE INVENTION

The present invention is a wideband receiver system and method for receiving signals in a wideband receiver system. The wideband receiver system monitors a wide band of radio frequencies for possible interferer (i.e., jammer) signals and re-configures one or more tunable filters to combat identified interferer signals. In certain embodiments, the wideband receiver system employs a dual receiver architecture comprised of a primary receiver having the tunable filters, and an auxiliary receiver for identifying interferer signals and extracting signal characteristics (e.g., center frequency, bandwidth, signal power) that characterize the interferer signals. In such embodiments, the primary receiver receives the signal characteristics from the auxiliary receiver, and then tunes the tunable filters based (at least in part) on the signal characteristics. By adaptively tuning the filters, the SNR of desired signals can be maintained above a minimal acceptable threshold level so as to enable recovery (e.g., demodulation, decoding and baseband processing) of desired signals by the primary receiver. In other embodiments, a single receiver is used, which performs the dual task of identifying interferer signals, tuning the adaptive filters, and recovery of desired signals.

According to the teachings of an embodiment of the present invention, there is provided a receiver system. The receiver system comprises: at least one antenna for receiving a plurality of signals, including a desired signal, across a wide band of frequencies; at least one tunable filter in signal communication with the at least one antenna for filtering the plurality of signals to produce a plurality of filtered signals; gain control circuitry in signal communication with the at least one tunable filter for producing a gain adjusted version of the filtered signals; and a processing unit configured to process received signals in a portion of the wide band to extract signal characteristics of at least one undesired signal in the portion of the wide band, wherein the at least one tunable filter is tuned based at least in part on signal characteristics of the at least one undesired signal to maintain a signal-to-noise ratio of the desired signal above a threshold level at output of the gain control circuitry.

Optionally, the at least one antenna, the at least one tunable filter, and the gain control circuitry form part of a primary receiver, and wherein the processing unit forms part of an auxiliary receiver that is separate from the primary receiver.

Optionally, the auxiliary receiver includes: at least one antenna for receiving signals in the wide band, and wherein the processing unit includes: an analog-to-digital converter in signal communication with the at least one antenna of the auxiliary receiver for converting the signals received by the at least one antenna of the auxiliary receiver to a plurality of digital signals, and a digital processing system in signal communication with the analog-to-digital converter for evaluating power and frequency values of the plurality of digital signals.

Optionally, the primary receiver includes a processing unit that includes: an analog-to-digital converter in signal communication with the gain control circuitry for converting the gain adjusted version of the filtered signals into a plurality of digital signals, and a digital processing system in signal communication with the analog-to-digital converter of the primary receiver for demodulating and decoding the plurality of digital signals so as to recover the desired signal.

Optionally, the primary receiver includes a processing unit configured to: receive the signal characteristics of the at least one undesired signal from the processing unit of the auxiliary receiver, and tune the at least one tunable filter based on the signal characteristics received from the processing unit of the auxiliary receiver.

Optionally, the desired signal includes message symbols transmitted during a signaling interval, and wherein the at least one tunable filter is tuned during the signaling interval.

Optionally, the gain control circuitry produces a gain adjusted version of the filtered signals during the signaling interval.

Optionally, the processing unit includes: an analog-to-digital converter in signal communication with the gain control circuitry for converting the gain adjusted version of the filtered signals into a plurality of digital signals, and a digital processing system in signal communication with the analog-to-digital converter for demodulating and decoding the plurality of digital signals so as to recover the desired signal.

Optionally, the at least one tunable filter includes at least one notch filter.

Optionally, the at least one notch filter is tuned by adjusting one or more tuning parameters including one or more of: center frequency, rejection bandwidth, rejection bandwidth shoulder, and attenuation depth.

Optionally, the at least one tunable filter includes at least one band-pass filter.

Optionally, the receiver system further comprises: a band-pass filter in signal communication with the at least one antenna configured to select a band of signals from the at least one antenna.

Optionally, the receiver system further comprises: a low-noise amplifier in signal communication with the band-pass filter for producing an amplified version of the signals in the selected band.

Optionally, the signal characteristics include at least one of power or frequency values of the at least one undesired signal.

Optionally, the at least one tunable filter is tuned so as to attenuate the at least one undesired signal sufficient to prevent adjusting the gain of the desired signal below a threshold level.

Optionally, the desired signal is in the portion of the wide band of frequencies.

Optionally, the wide band covers a bandwidth of at least 100 MHz.

Optionally, the wide band covers a bandwidth of at least 400 MHz.

Optionally, the at least one antenna includes exactly one antenna.

Optionally, the at least one antenna includes a plurality of antennas, and wherein each antenna of the plurality of antennas is operative to receive signals across the entire wide band of frequencies.

Optionally, the at least one antenna includes a plurality of antennas, and wherein each antenna of the plurality of antennas is operative to receive signals in a different respective portion of the wide band of frequencies.

There is also provided according to the teachings of an embodiment of the present invention, a receiver system. The receiver system comprises: a first receiver comprising: at least one antenna for receiving a plurality of signals, including a desired signal, across a wide band of frequencies, an interference mitigation unit in signal communication with the at least one antenna including at least one tunable filter, gain control circuitry in signal communication with the interference mitigation unit, and a processing unit in signal communication with the interference mitigation unit configured to demodulate and decode signals; and a second receiver comprising: at least one antenna for receiving a plurality of signals across a portion of the wide band, and a processing unit in signal communication with the at least one antenna of the second receiver and configured to: process the plurality of signals in the portion of the wide band to identify at least one undesired signal in the portion of the wide band and extract signal characteristics of the at least one undesired signal, wherein the at least one tunable filter is tuned based at least in part on the signal characteristics of the at least one undesired signal to maintain a signal-to-noise ratio of the desired signal above a threshold level at output of the gain control circuitry.

Optionally, the at least one tunable filter includes at least one notch filter.

Optionally, the at least one notch filter is tuned by adjusting one or more tuning parameters including one or more of: center frequency, rejection bandwidth, rejection bandwidth shoulder, and attenuation depth.

Optionally, the at least one tunable filter includes at least one band-pass filter.

Optionally, the at least one tunable filter is tuned so as to attenuate the at least one undesired signal sufficient to prevent adjusting the gain of the desired signal below a threshold level.

Optionally, the first receiver further comprises: a band-pass filter in signal communication with the at least one antenna of the first receiver and the interference mitigation unit, the band-pass filter configured to select a band of signals from the at least one antenna of the first receiver.

Optionally, the first receiver further comprises: a low-noise amplifier in signal communication with the band-pass filter and the interference mitigation unit.

Optionally, the processing unit of the first receiver is further configured to: receive, from the processing unit of the second receiver, the signal characteristics of the at least one undesired signal, and control the interference mitigation unit to tune the at least one tunable filter based on the received signal characteristics in order to filter the plurality of signals.

Optionally, the processing unit of the first receiver includes: an analog-to-digital converter in signal communication with the interference mitigation unit for converting the plurality of filtered signals to a plurality of filtered digital signals, and a digital processing system in signal communication with the analog-to-digital converter for demodulating and decoding the desired signal from the plurality of filtered digital signals.

Optionally, the processing unit of the second receiver includes: an analog-to-digital converter in signal communication with the at least one antenna of the second receiver for converting the signals received by the at least one antenna of the second receiver to a plurality of digital signals, and a digital processing system in signal communication with the analog-to-digital converter for evaluating power and frequency values of the plurality of digital signals.

Optionally, the desired signal is in the portion of the wide band of frequencies.

There is also provided according to the teachings of an embodiment of the present invention, a receiver system. The receiver system comprises: a first receiver comprising: at least one antenna for receiving a plurality of signals, including a desired signal, across a wide band of frequencies, an interference mitigation unit in signal communication with the at least one antenna unit including at least one tunable filter, gain control circuitry in signal communication with the interference mitigation unit, and a processing unit associated with the interference mitigation unit and a second receiver that receives a plurality of signals across at least a portion of the wide band, the processing unit configured to: receive, from the second receiver, signal information associated with at least one undesired signal in the wide band, and tune the at least one tunable filter based at least in part on the signal information associated with the at least one undesired signal to maintain a signal-to-noise ratio of the desired signal above a threshold level at output of the gain control circuitry.

Optionally, the receiver system further comprises: an auxiliary receiver corresponding to the second receiver comprising: at least one antenna for receiving the plurality of signals, and a processing unit configured to: process the plurality of signals so as to identify the at least one undesired signal and extract the signal information associated with the at least one undesired signal, and provide the signal information to the processing unit of the first receiver.

Optionally, the at least one tunable filter includes at least one notch filter.

Optionally, the at least one notch filter is tuned by adjusting one or more tuning parameters including one or more of: center frequency, rejection bandwidth, rejection bandwidth shoulder, and attenuation depth.

Optionally, the at least one tunable filter includes at least one band-pass filter.

Optionally, the at least one tunable filter is tuned so as to attenuate the at least one undesired signal sufficient to prevent adjusting the gain of the desired signal below a threshold level.

There is also provided according to the teachings of an embodiment of the present invention, a receiver system. The receiver system comprises: an auxiliary receiver comprising: at least one antenna for receiving a first plurality of signals across a portion of a wide band of frequencies, and a processing unit in signal communication with the at least one antenna and configured to process the first plurality of signals so as to identify at least one undesired signal in the portion of the wide band; and a primary receiver comprising: at least one antenna for receiving a second plurality of signals, including a desired signal, across the wide band of frequencies, at least one tunable filter in signal communication with the at least one antenna of the primary receiver for filtering the second plurality of signals to produce a plurality of filtered signals, gain control circuitry in signal communication with the at least one tunable filter for producing a gain adjusted version of the filtered signals, and a processing unit in signal communication with the gain control circuitry configured to: digitize the gain adjusted version of the filtered signals, and demodulate and decode the digitized signals so as to recover the desired signal, wherein the at least one tunable filter is tuned based at least in part on signal information associated with the at least one undesired signal extracted by the processing unit of the auxiliary receiver to maintain a signal-to-noise ratio of the desired signal above a threshold level at input to the processing unit of the primary receiver.

Optionally, the at least one filter includes at least one notch filter.

Optionally, the at least one notch filter is tuned by adjusting one or more tuning parameters including one or more of: center frequency, rejection bandwidth, rejection bandwidth shoulder, and attenuation depth.

Optionally, the at least one tunable filter includes at least one band-pass filter.

Optionally, the at least one tunable filter is tuned so as to attenuate the at least one undesired signal sufficient to prevent adjusting the gain of the desired signal below a threshold level.

Optionally, the desired signal is in the portion of the wide band of frequencies.

There is also provided according to the teachings of an embodiment of the present invention, a method for receiving signals. The method comprises: receiving, at one or more antenna, a plurality of signals, including a desired signal, across a wide band of frequencies; processing received signals in a portion of the wide band to identify at least one undesired signal in the portion of the wide band and extract signal characteristics associated with the at least one undesired signal; tuning at least one tunable filter based at least in part on the signal characteristics of the at least one undesired signal; passing the plurality of signals through the at least one tunable filter to produce a plurality of filtered signals; and passing the plurality of filtered signals through gain control circuitry to produce a gain adjusted version of the filtered signals, wherein the at least one tunable filter is tuned based at least in part on the signal characteristics of the at least one undesired signal to maintain a signal-to-noise ratio of the desired signal above a threshold level at output of the gain control circuitry.

Optionally, the processing the received signals includes: digitizing the received signals to produce a plurality of digitized signals, and analyzing the digitized signals to identify at least one of power or frequency values of the at least one undesired signal.

Optionally, the analyzing the digitized signals includes applying a Fast Fourier Transform to the digitized signals.

Optionally, the method further comprises: digitizing the gain adjusted version of the filtered signals to produce a plurality of digitized signals; and demodulating and decoding the digitized signals to recover the desired signal.

Optionally, the desired signal includes message symbols transmitted during a signaling interval, and the method further comprises: continually monitoring, during the signaling interval, for new undesired signals in one or more portions of the wide band by processing signals in the one or more portions of the wide band; and tuning the at least one tunable filter based at least in part on signal characteristics associated with the identified new undesired signals.

There is also provided according to the teachings of an embodiment of the present invention, a wideband multi-channel receiver system. The wideband multi-channel receiver system comprises: one or more antennas for receiving a plurality of signals across a wide band of frequencies; a plurality of band-pass filters in signal communication with the antenna unit, each of the band-pass filters configured to receive signals from some of the one or more antennas, the band-pass filters having different respective passbands and each band-pass filter configured to filter the signals from the some of the one or more antennas to produce a set of first filtered signals in the passband of the band-pass filter; an interference mitigation unit including at least one set of one or more tunable filters in signal communication with the band-pass filters configured to filter each set of the first filtered signals received from the band-pass filters to produce a corresponding set of second filtered signals; a plurality of gain control units in signal communication with the interference mitigation unit, each gain control unit configured to produce a gain adjusted version of signals for each set of second filtered signals; and a processing unit configured to process the plurality of signals across the wide band of frequencies so as to identify at least one undesired signal in the pass-band of one of the band-pass filters, wherein at least one of the tunable filters is tuned based at least in part on signal information associated with the at least one undesired signal to maintain a signal-to-noise ratio of a desired signal in the pass-band of the one of the band-pass filters above a threshold level at an output of a corresponding one of the gain control units.

Optionally, for each set of one or more tunable filters, the one or more tunable filters includes at least one notch filter.

Optionally, the at least one notch filter is tuned by adjusting one or more tuning parameters including one or more of: center frequency, rejection bandwidth, rejection bandwidth shoulder, and attenuation depth.

Optionally, for each set of one or more tunable filters, the one or more tunable filters includes at least one band-pass filter.

Optionally, each antenna of the one or more antennas is operative to receive signals across the entire wide band of frequencies.

Optionally, each antenna of the one or more antennas is operative to receive signals in a different respective portion of the wide band of frequencies.

There is also provided according to the teachings of an embodiment of the present invention, a receiver system. The receiver system comprises: at least one antenna for receiving a plurality of signals, including a desired signal, across a wide band of frequencies; at least one tunable filter in signal communication with the at least one antenna for filtering the plurality of signals to produce a plurality of filtered signals; a digital processing system configured to process received signals in a portion of the wide band to identify at least one undesired signal in the portion of the wide band; and an analog-to-digital converter for converting the plurality of filtered signals into a plurality of digital signals, wherein the at least one tunable filter is tuned based at least in part on signal information, extracted by the digital processing system and associated with the at least one undesired signal, to maintain a signal-to-noise ratio of the desired signal above a threshold level at an input to the analog-to-digital converter.

There is also provided according to the teachings of an embodiment of the present invention, a method for receiving signals. The method comprises: receiving signals, at one or more antenna, across a wide band of frequencies during a frame time associated with a communication frame of a desired signal; continually monitoring the received signals by processing the received signals that are received during a message sub-frame time of the communication frame to: i) identify one or more undesired signal in the wide band of frequencies that occur during the message sub-frame time, and ii) extract signal characteristics of the one or more undesired signal; tuning at least one tunable filter based at least in part on the signal characteristics of the one or more undesired signal and filtering the received signals by passing the received signals through the at least one tunable filter to produce filtered signals; and passing the filtered signals through gain control circuitry to produce a gain adjusted version of the filtered signals, wherein the at least one tunable filter is tuned so to maintain a signal-to-noise ratio of the desired signal above a threshold level at output of the gain control circuitry.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIG. 2 is an illustration of the frequency response of a filter bank of tunable band-stop filters of the interference mitigation unit of FIG. 1, according to embodiments of the present disclosure;

FIG. 3A is an illustration of the frequency response of a band-stop filter of the filter bank of FIG. 2, configured to combat a strong wide band interferer signal;

FIG. 3B is an illustration of the frequency response of a band-stop filter of the filter bank of FIG. 2, configured to combat a moderate wide band interferer signal;

FIG. 3C is an illustration of the frequency response of a band-stop filter of the filter bank of FIG. 2, configured to combat a strong narrow band interferer signal;

FIG. 3D is an illustration of the frequency response of a band-stop filter of the filter bank of FIG. 2, configured to combat a moderate narrow band interferer signal;

FIG. 4 is an illustration of the frequency response of a filter bank of tunable band-pass filters of the interference mitigation unit of FIG. 1, according to embodiments of the present disclosure;

FIG. 5A is an illustration of the frequency response of a band-pass filter of the filter bank of FIG. 4, configured with a wide pass band to pass signals in a wide band of frequencies and combat strong out-of-band interferer signals;

FIG. 5B is an illustration of the frequency response of a band-pass filter of the filter bank of FIG. 4, configured with a narrower pass band compared to FIG. 5A to pass signals in a narrower band of frequencies and combat strong out-of-band interferer signals;

FIG. 6A illustrates the power spectrum of a desired signal and an undesired signal that are present in the same wide band portion of a wide band of frequencies;

FIG. 6B illustrates the effect of a band-stop filter, similar to the band-stop filter of FIG. 3B, on the signals of FIG. 6A when tuned according to the undesired signal of FIG. 6A;

DESCRIPTION OF THE PREFERRED EMBODIMENTS

Figure 1:
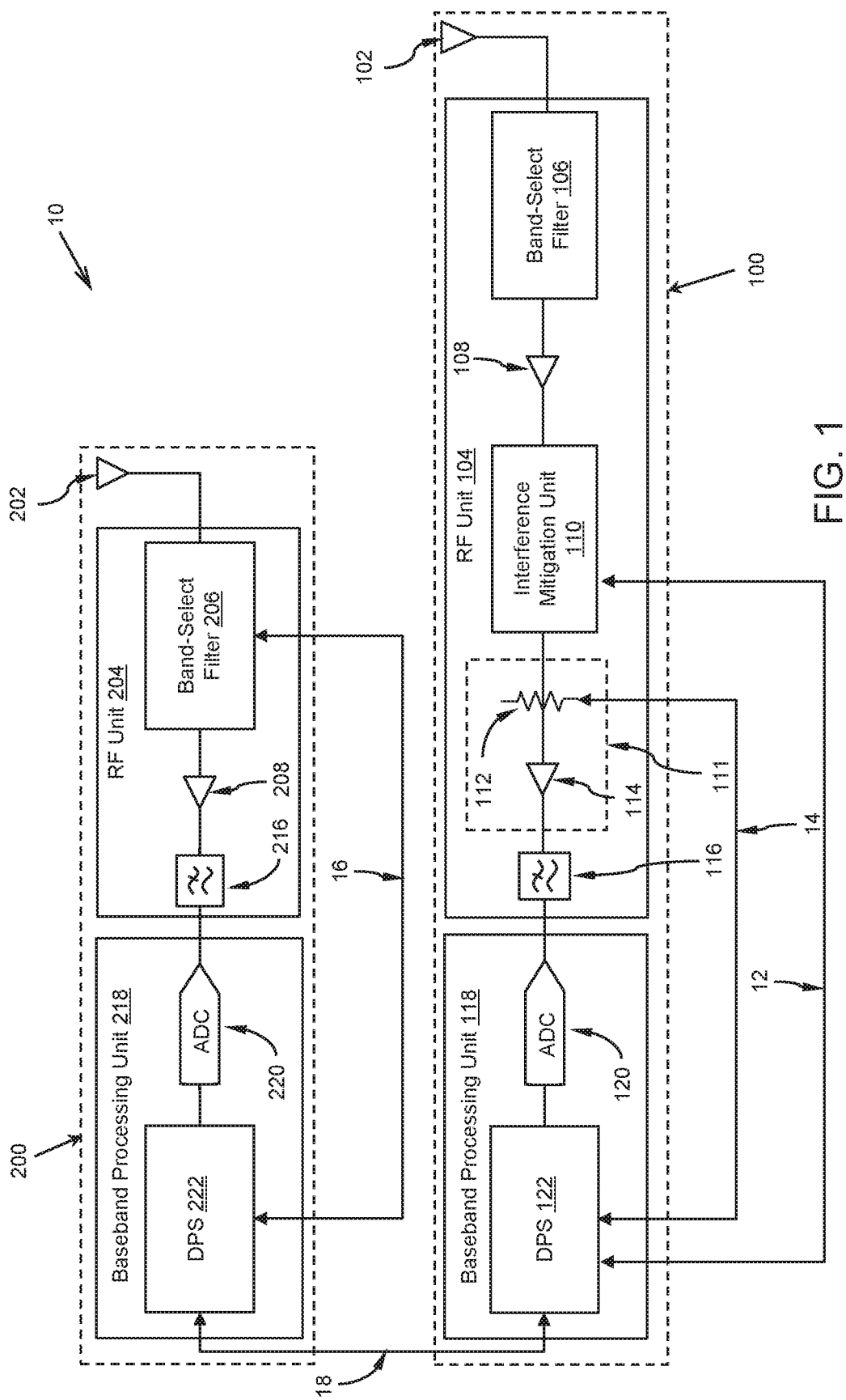
FIG. 1 is a block diagram of a wideband receiver system having an interference mitigation unit, according to embodiments of the present disclosure.

The present invention is a wideband direct sampling receiver system and method for receiving signals in a wideband receiver system.

The principles and operation of the system and method according to present invention may be better understood with reference to the drawings accompanying the description.

The systems and methods according to the present invention have many useful applications and are of particular value when applied within the context of communications systems, electronic warfare (EW) systems, and radar systems, where adversaries may attempt to interfere with signal detection capability of such systems by transmitting interference or jamming signals at particular frequencies or frequency bands.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Referring now to the drawings, FIG. 1 illustrates a wideband direct sampling receiver system (referred to interchangeably as a "receiver system"), generally designated 10, according to certain embodiments of the present disclosure. Generally speaking, the receiver system 10 is configured for receiving signal transmissions from one or more transmitters via one or more transmission channels. The transmission channels are preferably wide band channels capable of supporting signals across a wide band of radio frequencies. The receiver system 10 generally includes a primary receiver 100 (referred to interchangeably as a "first receiver", a "main receiver", or simply "receiver 100") and an auxiliary receiver 200 (referred to interchangeably as a "second receiver", a "sensor receiver", or simply "receiver 200").

Before describing the structure and operation of the receivers 100 and 200 in more detail, it is noted that in the embodiments illustrated in FIG. 1, the primary receiver 100 is generally configured to receive signals across a wide band of radio frequencies. Some signal captured by the primary receiver antenna may be desired signals (also referred to herein as "wanted signals"), but other signal captured by the primary receiver antenna may be undesired interference, such as noise and/or countermeasure or so-called jammer signals designed to interfere with the performance of the receiver 100. Such interference signals are collectively referred to herein interchangeably as "undesired signals", "jammer signals", or "interferer signals". In certain scenarios, these undesired signals may have received signal strength that is greater than the received signal strength of the desired signals, while in other scenarios the undesired signals have received signal strength that is less than the received signal strength of the desired signals. The goal of the primary receiver 100 is to process received signals (via a processing unit) in order to recover desired signals. However, undesired signals in the wide band can interfere with the ability of the primary receiver 100 to recover the desired signals. In certain scenarios, the interference of undesired signals can cause the automatic gain control (AGC) circuitry of the receiver 100 to attenuate the desired signals to the point of suppression of the desired signals and/or can degrade the SNR of desired signals below an acceptable threshold level. The auxiliary receiver 200 is configured to receive signals across at least a portion of the wide band and process the received signals to identify undesired signals operating in the portion of the wide band that may interfere with the performance of the receiver 100. The auxiliary receiver 200 processes the received signals to extract signal characteristics of the identified undesired signals and provides the signal characteristics to the receiver 100. The provided signal characteristics (also referred to as "signal information") is used by the receiver 100 to tune one or more tunable filters (also referred to as "adaptive filters" or "configurable filters") to filter the undesired signals prior to the undesired signal reaching the AGC circuitry of the receiver 100. By filtering the undesired signals, the received signal power of the undesired signals is sufficiently reduced so as to prevent triggering the AGC circuitry to adjust the gain (via attenuation) of desired signals below threshold values that would result in suppression of the desired signals. Within the context of this document, a desired signal is considered to be "suppressed" by AGC circuitry if the AGC circuitry attenuates the desired signal by an amount sufficient to reduce the signal power of the desired signal at the processing unit input such that the signal-to-noise ratio (SNR) is degraded below an acceptable threshold level. In an extreme case, the desired signal is suppressed such that the signal power of the desired signal is brought below the noise level or is masked by the interferer signal.

Parenthetically, in many scenarios, the identified undesired signals operate in the same portion (i.e., channel or selected frequency band) of the wide band as the desired signals (commonly referred to as co-channel interference). In other scenarios, the undesired signal and the desired signal operate in different channels, but the undesired signal may bleed into the desired signal channel (commonly referred to as adjacent-channel interference).

The following paragraphs describe the structure and operation of the receiver 100 according to certain embodiments of the present disclosure. In the embodiments illustrated in FIG. 1, the receiver 100 generally includes an antenna 102, an RF unit 104 (also referred to as an "RF stage", "RF section", or "RF head"), and a baseband processing and control unit 118 (referred to interchangeably as a "processing unit"). The RF unit 104 includes a band-select filter 106, a low-noise amplifier (LNA) 108, an interference mitigation unit 110, an AGC circuit 111, and an anti-aliasing filter (AAF) 116, all in signal communication with each other, either directly or indirectly. The band-select filter 106 and the LNA 108 form part of an RF front-end of the RF unit 104, while the AGC circuit 111 and the AAF 116 form part of an RF back-end of the RF unit 104. The baseband processing and control unit 118 includes an analog-to-digital converter (ADC) 120 and a digital processing system (DPS) 122. The baseband processing and control unit 118 is generally configured to digitize and process received signals in order to recover desired signals in the wide band, and to provide control signals to components of the RF unit 104. However, it is noted that in certain embodiments the baseband processing and control unit 118 may be further configured to digitize and process received signals in portions of the wide band in order to identify jammer signals and characteristics of the identified jammer signals.

The antenna 102 is operable to receive a plurality of radio signals across a frequency band. In general, the antenna 102 is configured to receive signals across a wide band of frequencies, where the term "wide band" generally refers to bands that are at least 50 MHz wide, and more preferably at least 100 MHz. Such wide bands can include bands of frequencies that are at least several hundreds or thousands of MHz wide, and in certain cases bands of frequencies that are up to 3 GHz wide. The wide band of frequencies may span across portions of one or more sub-bands of the radio spectrum, including, for example, the high frequency (HF) band (covering frequencies in the range of 3-30 MHZ), the very high frequency (VHF) band (covering frequencies in the range of 30-300 MHz), the ultra-high frequency (UHF) band (covering frequencies in the range of 300-3000 MHz), the super high frequency (SHF) band (covering frequencies in the range of 3-30 GHz), and the extremely high frequency (EHF) band (covering frequencies in the range of 30-300 GHz).

Although depicted as a single antenna in the drawings, the antenna 102 may include a plurality of antennas. In certain embodiments, each antenna is configured to receive radio signals across the entire wide band of frequencies, while in other embodiments, each antenna is configured to receive radio signals across different wide band portions of the wide band of frequencies. For example, if the entire wide band of frequencies covers a band of frequencies in the range of 50-550 MHz, a first antenna may be configured to receive radio signals in a wide band portion of the wide band covering 50-300 MHz, and a second antenna may be configured to receive radio signals in a wide band portion of the wide band covering 300-550 MHz. In this example, both wide band portions of the main wide band (50-550 MHZ) are "wide band" in the sense that they span bands that are 250 MHz wide.

In preferred embodiments, the band-select filter 106 is in signal communication with the antenna 102. The band-select filter 106 is a band-pass filter that is configured to select a desired wide band portion of signals from the antenna 102, and reject signals outside of the desired band. For example, if the antenna 102 receives signals across a wide band covering 50-550 MHz, the band-select filter can be configured to select signals in a desired band covering 100-500 MHz. Although not depicted in the drawings, the band-select filter 106 may be tunable by the processing unit 118 (or another processing or control system linked to the receiver system 10) in order to select a desired band of interest.

The LNA 108 is in signal communication with the band-select filter 106, and is configured to increase the signal strength of the selected band of signals from the band-select filter 106 and to prevent noise in subsequent stages from contributing materially to signal sensitivity. In general, the LNA 108 provides the targeted noise figure (NF) of the RF unit 104. Note that in certain scenarios the antenna 102 may be limited to receive signals in the desired portion of the wide band. In such scenarios, the band-select filter 106 may not be required, and the LNA 108 is in direct signal communication with the antenna 102. The amplification level imparted by the LNA 108 may be configured (i.e., set) by the processing unit 118 (or another processing or control system linked to the receiver system 10).

In preferred embodiments, the interference mitigation unit 110 is in signal communication with the LNA 108. The interference mitigation unit 110 generally includes at least one tunable filter, preferably implemented as a filter bank of tunable band-stop filters, more preferably tunable notch filters, and/or a filter bank of tunable band-pass filters. In general, the interference mitigation unit 110 is configured to mitigate interference effects from undesired signals by filtering the signals received from the antenna 102 (which in preferred embodiments are the band-selected and amplified signals from the band-select filter 106 and the LNA 108) to produce filtered signals. The tunable filters of the interference mitigation unit 110 are tuned in accordance with the extracted (i.e., derived) signal information that is associated with undesired signals that are identified by the auxiliary receiver 200 so as to reduce the signal strength of the undesired signals. The structure of the interference mitigation unit 110 will be described in detail in subsequent sections of the present disclosure.

The AGC circuit 111 (also referred to as "AGC circuitry", "AGC unit", or simply "AGC") is in signal communication with the interference mitigation unit 110, and is configured to receive as input filtered signals from the interference mitigation unit 110 and produce as output a gain adjusted version of the input filtered signals. In certain embodiments, the AGC circuit 111 includes at least an attenuator 112 and an amplifier 114, but may include additional electronic elements commonly found in AGC circuits. As is known in the art, a wide variety of AGC circuit architectures are available, including those which include one or more of comparators, low-pass filters, band-pass filters, power detectors, operational amplifiers, and the like, in order to maintain a suitable signal strength at the AGC output despite variation of the signal strength at the AGC input so as to not limit the dynamic range of signal input to the ADC 120. Elements of these AGC circuit architectures can be incorporated into the AGC circuit 111 in order to achieve suitable automatic gain control functionality. It is also noted that in certain embodiments, the interference mitigation unit 110 and the AGC circuit 111 together form part of an AGC system.

The attenuator 112 is configured to attenuate the filtered signals from the interference mitigation unit 110. In the illustrated embodiment, the attenuator 112 is implemented as a digitally controlled attenuator (DCA). However, other embodiments are possible in which the attenuator 112 is implemented in other ways, including, for example, as a variable voltage attenuator (VVA). The amplifier 114 is in signal communication with the attenuator 112, and is configured to increase the signal strength of the attenuated signals from the attenuator 112. In preferred but non-limiting embodiments, the amplifier 114 is implemented as a gain block.

The AAF 116 is in signal communication with the amplifier 114, and is configured to pass frequencies that are below the Nyquist bandwidth associated with the sampling rate of the ADC 120 and reject frequencies above the Nyquist bandwidth. In certain embodiments, the AAF 116 is implemented as a low-pass filter having the associated Nyquist frequency as the filter cutoff frequency. In other embodiments, for example in cases where the ADC 120 may perform undersampling or downsampling, the AAF 116 is implemented as a band-pass filter. The filter parameters of the AAF 116 may be configured by the processing unit 118 (or another processing or control system linked to the receiver system 10).

The ADC 120 is in signal communication with the AAF 116, and is configured to convert the signals from the AAF 116 to digital signals, i.e., to digitize the signals from the AAF 116. In preferred embodiments, the ADC 120 is a high-speed high-dynamic-range ADC, such as those used in direct RF sampling receivers that can be, for example, implemented as software defined radio receivers. Most direct RF sampling ADCs achieve a high clock rate using interleaving techniques.

The DPS 122 is in signal communication with the ADC 120, and is configured to process the digital signals from the ADC 120. In general, the DPS 122 includes a modem for demodulating, decoding and generating digitized baseband signals according to the modulation and coding scheme employed by the transmitter, and a processor, for example in the form of a digital signal processor (DSP), for processing the digitized baseband signals to recover desired signals in the selected band of signals from the band-select filter 106 and in certain instances to extract signal information from the digitized baseband signals. In addition to processing digital signals from the ADC 120, the DPS 122 is also configured to control the interference mitigation unit 110 and the attenuator 112 by providing control signals to the interference mitigation unit 110 and the attenuator 112 via respective control lines 12 and 14. Accordingly, the DPS 122 controls activation/actuation of the AGC circuit 111, and controls the tuning of the tunable filters of the interference mitigation unit 110.

The following paragraphs describe the structure and operation of the receiver 200 according to certain embodiments of the present disclosure. In the embodiments illustrated in FIG. 1, the receiver 200 generally includes an antenna 202, an RF unit 204, and a baseband processing and control unit 218 (referred to interchangeably as "processing unit 218"). As can be seen from FIG. 1, the receiver 200 is similar to the receiver 100, with several notable differences, as will become apparent from the subsequent description. The RF unit 204 includes a band-select filter 206, an amplifier 208, and an AAF 216, all in signal communication with each other, either directly or indirectly. The baseband processing and control unit 218 includes an ADC 220 and a DPS 222, and is generally configured to digitize and process received signals in portions of the wide band in order to identify jammer signals and characteristics of the identified jammer signals.

The antenna 202 is generally similar to the antenna 102, and is configured to receive a plurality of radio signals across at least a portion of the same frequency band as the antenna 102. In certain embodiments, the portion of the frequency band is entire wide band, whereby the antenna 202 is configured to receive radio signals across the same entire wide band as the antenna 102. Similar to the antenna 102, the antenna 202 may include a plurality of antennas, each configured to receive radio signals across the band, or each configured to receive radio signals across different portions of the overall band. In certain embodiments, the receivers 100 and 200 may share a single antenna or a group of antennas, and a directional coupler, router, power splitter, RF switch, or any other signal routing mechanism can be deployed to transfer the electromagnetic radiation received by the shared antenna(s) to both of the RF units 104, 204.

The band-select filter 206 is in signal communication with the antenna 202. The band-select filter 206 is a band-pass filter that is configured to select a desired band of signals from the antenna 202, and reject signals outside of the desired band. In the embodiments illustrated in FIG. 1, the band-select filter 206 is a tunable filter that can be tuned to different bands within the wide band covered by the antenna 202. In preferred embodiments, the DPS 222 provides tuning control of the band-select filter 206 via control line 16.

The amplifier 208 is in signal communication with the band-select filter 206, and is configured to increase the signal strength of the selected band of signals from the band-select filter 206. In preferred embodiments, the amplifier 208 is implemented as a high-linearity gain block, which unlike the LNA 108, is able to provide signal amplification with an increased compression point.

The AAF 216 is in signal communication with the amplifier 208, and is configured to pass frequencies that are below the Nyquist bandwidth associated with the sampling rate of the ADC 220 and reject frequencies above the Nyquist bandwidth. In certain embodiments, the AAF 216 is implemented as a low-pass filter having the associated Nyquist frequency as the cutoff frequency. In other embodiments, for example in cases where the ADC 220 may perform undersampling or downsampling, the AAF 216 is implemented as a band-pass filter.

The ADC 220 is in signal communication with the AAF 216, and is configured to convert the signals from the AAF 216 to digital signals, i.e., to digitize the signals from the AAF 216. The ADC 220 is preferably a high-speed high-dynamic-range ADC, similar to the ADC 120. The DPS 222 is in signal communication with the ADC 220, and is configured to process the digital signals from the ADC 220. In contrast to the DPS 122, which processes signals by demodulating and decoding signals in order to recover desired signals, the DPS 222 is generally configured to process received signals in order to identify undesired signals in the selected band of signals from the band-select filter 206, and to extract signal information (i.e., signal characteristics), such as signal frequency, signal bandwidth, and signal power, associated with the identified undesired signals.

Various methodologies for identifying interfering signals and their associated signal characteristics are known in the art. In one non-limiting example, the DPS 222 is configured to perform a Fast Fourier Transform (FFT) on the output digitized signals from the ADC 220 to determine the frequency of an undesired signal. In another non-limiting example, the DPS 222 is configured to perform power estimation (i.e., power spectral density estimation) of undesired signals by performing FFT on the ADC digitized signal output and calculating the power of the FFT output by calculating the power contribution of the in-phase (I) and quadrature (Q) components of the FFT output, and then summing together the I and Q power contributions. This method of power estimation is generally referred to as $I^2+Q^2$.

Once the DPS 222 extracts the signal characteristics of the undesired signal, the DPS 222 provides the extracted signal characteristics to the DPS 122 via control line 18. The DPS 122 then utilizes the extracted signal characteristics received from the DPS 222 to tune the tunable filters of the interference mitigation unit 110 in accordance with the signal characteristics of the undesired signals.

Preferably, the interference mitigation unit 110 is implemented as a filter bank having a plurality of tunable filters. In certain embodiments, the tunable filters of the filter bank are tunable band-stop filters, preferably tunable notch filters, whereas in other embodiments the tunable filters of the filter bank are tunable band-pass filters. In yet other embodiments, the filter bank includes a bank of tunable band-stop and/or notch filters followed by a bank of tunable band-stop filters, or a bank of tunable band-pass filters followed by a bank of tunable band-stop and/or notch filters. In other embodiments, the filter bank includes tunable band-stop and/or notch filters as well as band-pass filters.

In one set of preferred but non-limiting embodiments, the interference mitigation unit 110 includes a filter bank having a set of one or more tunable band-stop filters (which may be implemented as notch filters) that are configured to attenuate signal power at frequencies in a configurable rejection band. In general, each tunable filter of the band-stop filter bank is configured to be tuned by varying the following tuning parameters: i) center frequency, ii) rejection bandwidth, iii) rejection bandwidth shoulder, and iv) attenuation depth. Each band-stop filter performs filtering of signals such that: i) frequencies in the rejection bandwidth are maximally attenuated according to the attenuation depth, ii) frequencies outside of the rejection bandwidth shoulder are not attenuated by the filter, and iii) frequencies in a variable attenuation region, defined as being outside of the rejection bandwidth and inside of the rejection bandwidth shoulder, are attenuated according to an attenuation that typically varies as a function of frequency. In certain embodiments, the band-stop filter bank may include a set of one or more filters that are configured to reject strong jammer signals having a relatively wide signal bandwidth, or a set of one or more filters configured to reject moderate jammer signals having a relatively wide signal bandwidth, or a set of one or more filters configured to reject strong jammer signals having a relatively narrow signal bandwidth, or a set of one or more filters configured to reject moderate jammer signals having a relatively narrow signal bandwidth, or any combination thereof.

Referring now to FIG. 2, there is shown the frequency response of tunable band-stop filters of a filter bank 20 according to a non-limiting example that can be used in the interference mitigation unit 110 according to certain non-limiting embodiments of the present disclosure. In the illustrated example, the filter bank 20 includes a set of four tunable band-stop filters 22a, 22b, 22c, 22d that are configured to attenuate signal power at frequencies in a configurable rejection band to combat different types of jammer signals. It is noted that the filter bank 20 may include fewer than four band-stop filters or more than four band-stop filters, depending on the configuration of the system 10. At least some of the rejection bands of the band-stop filters are relatively narrow, therefore in the present example at least some of the band-stop filters may be equivalently referred to as notch filters.

In the present example, the four filters 22a, 22b, 22c, 22d are shown as being tuned to filter four different types of interferer or jamming signals. The frequency responses of the filters 22a, 22b, 22c, 22d, when tuned according to specific tuning parameters in order to combat different types of jammer signals, are shown respectively in FIGS. 3A-3D. The horizontal and vertical axes in FIGS. 2-3D represent frequency and magnitude (i.e., gain/attenuation), respectively. The magnitude is measured in decibels (dB).

Looking first at FIG. 3A, the filter 22a is shown as being tuned according to signal characteristics of a particular jammer signal type in order to combat a strong jammer signal having a relatively wide signal bandwidth. This type of jammer is referred to as a "strong wide band jammer". Here, the center frequency 23a of the filter 22a is set according to the center frequency $f_a$ of the strong wide band jammer signal, and the rejection bandwidth 26a is set according to the bandwidth $B_2$ of the strong wide band jammer signal, based on the signal characteristics determined by the DPS 222. In order to reduce the effect of the filter 22a on desired signals, the rejection bandwidth shoulder 24a is set to By according to the center frequency and bandwidth of the desired signals, such that the spectrum of desired signals at a particular center frequency and bandwidth do not overlap with the bandwidth 24a. In addition, the attenuation depth 28a is set to a steep level $R_1$ in accordance with the strong power of the wide band jammer signal (based on the signal characteristics determined by the DPS 222) such that the filter 22a effectively attenuates strong wide band jammer signals that are centered at frequency $f_a$ and have bandwidth $B_2$.

Turning now to FIG. 3B, the filter 22b is shown as being tuned according to signal characteristics of a particular jammer signal type in order to combat a moderate jammer signal having a relatively wide signal bandwidth. This type of jammer is referred to as a "moderate wide band jammer". Here, the center frequency 23b of the filter 22b is set according to the center frequency $f_b$ of the moderate wide band jammer signal, and the rejection bandwidth 26b is set according to the bandwidth $B_2$ of the moderate wide band jammer signal, based on the signal characteristics determined by the DPS 222. In order to reduce the effect of the filter 22b on desired signals, the rejection bandwidth shoulder 24b is set to B/according to the center frequency and bandwidth of the desired signals, such that the spectrum of desired signals at a particular center frequency and bandwidth do not overlap with the bandwidth 24b. In addition, the attenuation depth 28b is set to a moderate level $R_2$ in accordance with the moderate power of the wide band jammer signal (based on the signal characteristics determined by the DPS 222) such that the filter 22b effectively attenuates moderate wide band jammer signals that are centered at frequency $f_b$ and have bandwidth $B_2$.

Looking now at FIG. 3C, the filter 22c is shown as being tuned according to signal characteristics of a particular jammer signal type in order to combat a strong jammer signal having a relatively narrow signal bandwidth. This type of jammer is referred to as a "strong narrow band jammer". Here, the center frequency 23c of the filter 22c is set according to the center frequency $f_c$ of the strong narrow band jammer signal, and the rejection bandwidth 26c is set according to the bandwidth $B_4$ of the strong narrow band jammer signal, based on the signal characteristics determined by the DPS 222. In order to reduce the effect of the filter 22c on desired signals, the rejection bandwidth shoulder 24c is set to $B_3$ according to the center frequency and bandwidth of the desired signals, such that the spectrum of desired signals at a particular center frequency and bandwidth do not overlap with the bandwidth 24c. In addition, the attenuation depth 28c is set to a steep level R in accordance with the strong power of the narrow band jammer signal (based on the signal characteristics determined by the DPS 222) such that the filter 22c effectively attenuates strong narrow band jammer signals that are centered at frequency $f_c$ and have bandwidth $B_4$.

Turning now to FIG. 3D, the filter 22d is shown as being tuned according to signal characteristics of a particular jammer signal type in order to combat a moderate jammer signal having a relatively narrow signal bandwidth. This type of jammer is referred to as a "moderate narrow band jammer". Here, the center frequency 23d of the filter 22d is set according to the center frequency $f_d$ of the moderate narrow band jammer signal, and the rejection bandwidth 26d is set according to the bandwidth $B_4$ of the moderate narrow band jammer signal, based on the signal characteristics determined by the DPS 222. In order to reduce the effect of the filter 22d on desired signals, the rejection bandwidth shoulder 24d is set to $B_3$ according to the center frequency and bandwidth of the desired signals, such that the spectrum of desired signals at a particular center frequency and bandwidth do not overlap with the bandwidth 24d. In addition, the attenuation depth 28d is set to a moderate level $R_2$ in accordance with the moderate power of the narrow band jammer signal (based on the signal characteristics determined by the DPS 222) such that the filter 22d effectively attenuates moderate narrow band jammer signals that are centered at frequency $f_d$ and have bandwidth $B_4$.

It is noted that the signal characteristics (e.g., center frequency, bandwidth, signal power) of the desired signals may also be determined by the DPS 222, or may be determined by the DPS 122, using similar techniques, e.g., FFT and $I^2+Q^2$, used for determining signal characteristics of the undesired signals.

Instead of, or in combination with a band-stop filter bank, the interference mitigation unit 110 may include a filter bank having a set of one or more tunable band-pass filters that are configured to pass signal power at frequencies in a desired spectral pass band and attenuate signal power at frequencies outside of a pass band. In general, each tunable filter of the band-pass filter bank is configured to be tuned by varying one or more of the following tuning parameters: i) center frequency, ii) filter bandwidth, iii) filter pass band, and iv) attenuation depth. Each band-pass filter performs filtering of signals such that: i) frequencies outside of the filter bandwidth are maximally attenuated according to the attenuation depth, ii) frequencies inside of the filter pass band are not attenuated by the filter, and iii) frequencies in a variable attenuation region, defined as being outside of the filter pass band and inside of the filter bandwidth, are attenuated according to an attenuation that typically varies as a function of frequency. In certain embodiments, the band-pass filter bank may include a set of one or more filters that are configured to pass signals for wide band reception, or a set of one or more filters configured to pass signals for narrow band reception, or a combination of sets to pass wide band and narrow band signals.

Referring now to FIG. 4, there is shown the frequency response of tunable band-pass filters of a filter bank 30 according to another non-limiting example that can be used in the interference mitigation unit 110 according to certain non-limiting embodiments of the present disclosure. In the illustrated example, the filter bank 30 includes a set of two tunable band-pass filters 32a, 32b that are configured to pass signal power at frequencies in a desired spectral pass band and attenuate signal power at frequencies outside of a pass band. It is noted that the filter bank 30 may include fewer than two band-pass filters or more than two band-pass filters, depending on the configuration of the system 10. In the present example, one of the filters 32a is tuned so as to pass a wide band of signals while providing strong out-of-band jammer signal rejection, while the other filter 32b is tuned so as to pass a narrow band of signals while providing strong out-of-band jammer signal rejection. The frequency responses of the filters 32a and 32b, when tuned according to specific tuning parameters, are shown respectively in FIGS. 5A and 5B. The horizontal and vertical axes in FIGS. 4-5B represent frequency and magnitude (i.e., gain/attenuation), respectively. The magnitude is measured in decibels (dB).

Looking first at FIG. 5A, the filter 32a is shown as being tuned according to signal characteristics of a particular jammer signal type in order to combat a strong out-of-band jammer signal while simultaneously passing a desired wide band of signals. Here, the center frequency 33a of the filter 32a is set according to the center frequency $f_a$ of the desired wide band of signals, and the pass band 36a is set according to the bandwidth $B_1$ of the desired wide band, for example based on the signal characteristics determined by the DPS 222. In order to reject strong out-of-band jammer signals, the filter bandwidth 34a is set to $B_2$, also according to the center frequency and bandwidth of the desired wide band of signals as well as the center frequency and bandwidth of jammer signals, for example based on the signal characteristics determined by the DPS 222. In addition, the attenuation depth 38a is set to a steep level $R_1$ in accordance with the strong power of potential out-of-band jammer signals (based on the signal characteristics determined by the DPS 222) such that the filter 22a effectively attenuates strong jammer signals that are outside of the band region defined by center frequency $f_a$ and bandwidth $B_2$.

Turning now to FIG. 5B, the filter 32b is shown as being tuned according to signal characteristics of a particular jammer signal type in order to combat a strong out-of-band jammer signal while simultaneously passing a desired narrow band of signals. Here, the center frequency 33b of the filter 32b is set according to the center frequency $f_b$ of the desired narrow band of signals, and the pass band 36b is set according to the bandwidth $B_3$ of the desired narrow band, for example based on the signal characteristics determined by the DPS 222. In order to reject strong out-of-band jammer signals, the filter bandwidth 34b is set to $B_4$, also according to the center frequency and bandwidth of the desired narrow band of signals, for example based on the signal characteristics determined by the DPS 222. In addition, the attenuation depth 38b is set to a steep level $R_1$ in accordance with the strong power of potential out-of-band jammer signals (based on the signal characteristics determined by the DPS 222) such that the filter 32a effectively attenuates strong jammer signals that are outside of the band region defined by center frequency $f_b$ and bandwidth $B_4$.

Parenthetically, it is noted that various jammer signals of different types may occur simultaneously or contemporaneously. Therefore, the configuration of one or more band-stop filters and/or notch filters and/or band-pass filters may vary for each particular jammer signal according to the specific jammer type. Furthermore, as should be apparent, FIGS. 2-5B generally depict frequency responses for ideal (or close to ideal) filters in which the attenuation varies linearly with frequency in the variable attenuation region. In practice, it should be expected that the filters may have a non-ideal roll-off resulting in a non-linear attenuation in the variable attenuation region.

Referring now to FIGS. 6A and 6B, there is shown the power spectra of a desired signal and an undesired signal that are part of signals which are received in a wide band, and the effect of filtering the received signals by a tunable filter of the interference mitigation unit 110. It is noted that the power spectra of the signals and the frequency response of the tunable filter are not necessarily drawn to scale in FIGS. 6A and 6B.

Looking first at FIG. 6A, the received signals include a desired signal 70 and at least one undesired signal 76 in a wide band of frequencies (generally designated as WB). In this particular case, both the desired signal and the undesired signal occupy the same wide band portion of WB (generally designated $WB_P$). The desired signal 70 has a center frequency 71 of $f_D$ and the undesired signal 76 has a center frequency 77 of $f_J$.

FIG. 6B shows the effect of filtering the received signals with a tunable filter. In the illustrated example, the tunable filter is a band-stop filter, similar to the band-stop filter 22b illustrated in FIGS. 2 and 3B. The DPS 222 identifies the undesired signal and extracts signal information (i.e., signal characteristics) using the techniques discussed above (e.g., FFT and $I^2+Q^2$). In this illustrated example, the DPS 222 processes received signals to extract the following signal information that characterizes the identified undesired signal as having: center frequency 76 of $f_J$, signal bandwidth 78 of $B_2$, and received input power 80a (i.e., signal strength) of $J_a$.

The desired signal has a signal bandwidth 72 of $B_D$ centered at frequency 70 of $f_b$ and peak received input power 74a of $D_a$. In this particular example, the desired and undesired signals are separated in frequency such that there is no overlap in bandwidth between the two signals. The protection ratio (PR) at the input to the filter 22a is designated 82a. The PR is generally defined as the ratio between the power of the undesired signal and the desired signal. Since the signal powers are measured in decibels (dB), the PR is the difference between the power (dB) of the undesired signal and the power (dB) of the desired signal (i.e., $J_a$-$D_a$).

The DPS 222 provides the extracted signal information to the DPS 122, which in turn configures (i.e., tunes) the filter 22a based at least in part on the extracted signal information (i.e., the filter 22a is tuned in part based on the signal characteristics of the undesired signal). In this particular example, the filter 22a is tuned to center frequency $f_J$, with filter bandwidth $B_2$ (corresponding to the center frequency and signal bandwidth of the identified undesired signal), and the attenuation depth $R_1$ is set according to the peak received input power $J_a$. The rejection bandwidth shoulder of the filter 22a can also be set according to the characteristics of the desired signal (e.g., center frequency $f_D$ and bandwidth $B_D$).

At the output of the filter 22a, the filtered desired signal (designated 70F) has an output power 74b of $D_b$, and the filtered undesired signal (designated 76F) has a reduced output power 80b of $J_b$, resulting in an output PR 82b that is significantly smaller than the input PR 82*a*. Since the filter 22*a* is tuned according to the signal characteristics of the undesired signal, the filter 22*a* attenuates the undesired signal with particular efficacy while minimally attenuating the desired signal. Typically, the desired signal is only attenuated due to insertion loss. As a result of the filtering imparted by the tunable filter(s), the interference mitigation unit 110 is able to improve the PR such that the output PR is small enough (i.e., below a threshold) so as to prevent the AGC circuit 111 from suppressing the desired signal. In particular, the interference mitigation unit 110 prevents undesired signals from triggering the AGC circuit 111 to attenuate the desired signal below a threshold level, thereby preventing the SNR of the desired signal from dropping below an acceptable threshold level at the output of AGC 111 (and the input to the processing unit 118, in particular the ADC 120), and thereby maintaining the SNR of the desired signal above the threshold level at the output of the AGC 111 (and input to the ADC 120). In scenarios in which the signal power of the undesired signal is significantly greater than the signal power of the desired signal to the point that the undesired signal blocks or masks the desired signal and degrades the SNR of the desired signal below an acceptable threshold level, the band-stop filter may sufficiently reduce the output power of the undesired signal as compared to the signal power of the desired signal such that the undesired signal no longer blocks the desired signal, thereby maintaining the SNR of the desired signal above the threshold level.

The acceptable SNR threshold for a given desired signal is generally defined as the smallest SNR at which the receiver system can recover the desired signal, which may include extraction of the information contained in the desired signal within an error rate defined by specifications of the receiver system. For example, in the case of a cooperative digital communication system, the acceptable SNR threshold for a desired signal is generally the smallest SNR at which the receiver can recover a transmitted bit stream within a bit-error-rate (BER) or symbol-error-rate (SER) defined by the transmitter-receiver system specification. The recovery process of the desired signal to recover a transmitted bit stream typically includes demodulation and decoding of the digitized signals at the DPS. The acceptable SNR threshold level for a given desired signal may be based on several factors, including, for example, the transmission parameters of the signal, such as, for example, the modulation and encoding scheme used in signal transmission. For example, modulation schemes of smaller constellation size (e.g., binary phase-shift keying (BPSK) or quadrature phase-shift keying (QPSK)) used in combination with error-correcting codes of low code rate (i.e., code rates less than ½ such as ⅓, ¼, ⅕, etc.) may enable recovery of desired signals at low SNR (in some cases negative SNR) which produce BER on the order of $10^{-9}$, whereas modulation schemes of larger constellation size (e.g., 8PSK, M-quadrature amplitude modulation (M-QAM) or M amplitude and phase-shift keying (M-PSK) for $M=2^n$ and $n>3$)) used in combination with error-correcting codes of higher code rate (i.e., code rates above ½ such as ⅔, ¾, ⅚, etc.) may require larger SNR (compared to the small constellation and low code rate counterparts) to achieve BER of $10^{-9}$.

It is noted that although the illustrated embodiments depict the DPS 122 providing control signals to the AGC circuit 111 and the interference mitigation unit 110 so as to control the AGC circuit 111 and the interference mitigation unit 110, the control input may alternatively be provided by the DPS 222. For example, subsequent to identifying jammer signals and the associated jammer signal characteristics, the DPS 222 may control the AGC circuit 111 and/or tune the tunable filters of the interference mitigation unit 110 according to the determined jammer signal characteristics.

Although the embodiments described thus far have pertained to using an auxiliary receiver having a DPS, that processes the received signals in at least a portion of the wide band reception, in order to identify jammer signals and the associated jammer signal characteristics, and either directly tuning one or more tunable filters of a primary receiver based at least in part on the jammer signal characteristics, or providing the signal information to the DPS of the primary receiver to enable the primary receiver DPS to tune the one or more tunable filters, other embodiments are possible in which a single receiver is used to perform both wide band signal reception, and processing to recover the desired signals as well as signal reception and processing to identify jammer signals and determination of the jammer signal characteristics. In some of such embodiments, the single receiver may use a single DPS 122, which in addition to performing demodulation and decoding, is also configured to: i) process received signals in at least a portion of the wide band reception in order to identify jammer signals and to extract jammer signal characteristics, and ii) tune the tunable filters of the interference mitigation unit based at least in part on the jammer signal characteristics. In other such embodiments, the processing unit 118 of the single receiver can include a second DPS that is also in signal communication with the ADC 120 so as to operate in parallel with the DPS 122. The second DPS receives digitized signals from the ADC 120, and is configured to process the received digitized signals in at least a portion of the wide band in order to identify jammer signals and to extract jammer signal characteristics. Such single receiver embodiments may provide certain advantages over the auxiliary receiver embodiments described above in terms of hardware requirements for the RF stage, and in certain instances hardware requirements for the baseband processing stage. In particular, by utilizing a single receiver, only one band-select filter, gain block, and anti-aliasing filter are required. However, when using a single DPS in the single receiver, the single DPS is required to perform additional computations, increasing the computational resources required to implement the DPS. Similarly, when using a pair of DPSs in a single receiver, the additional hardware required for implementing the second DPS, and the resources required for routing the digitized data from the ADC 120 to two DPSs, may offset the hardware savings gained by removing the auxiliary receiver.

Other embodiments based on a primary receiver and auxiliary receiver configuration are also contemplated herein in which both receivers perform wide band signal reception and processing to recover desired signals as well as signal reception and processing to identify jammer signals and jammer signal characteristics.

Figure 7:
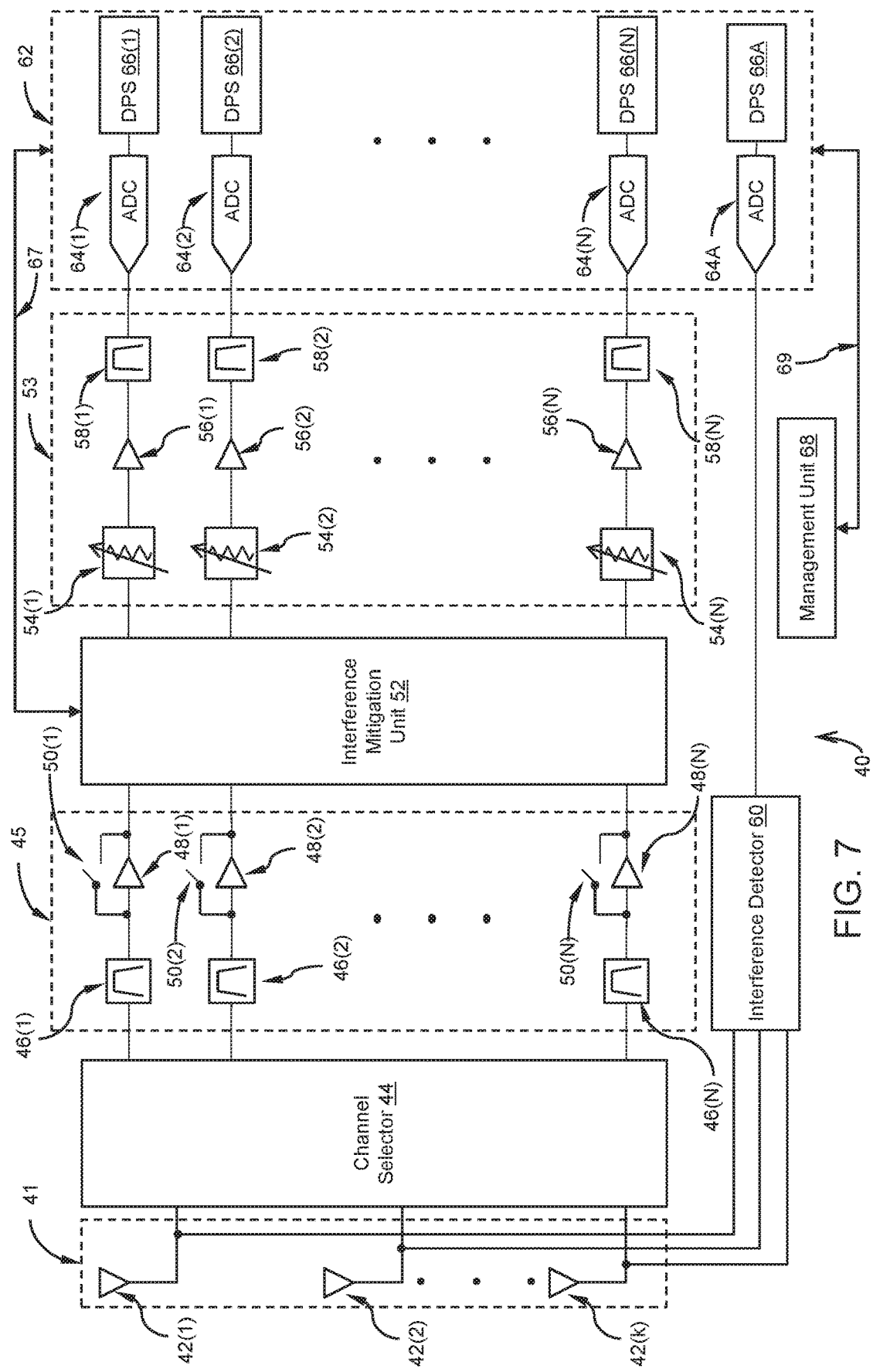
FIG. 7 is a block diagram of a wideband multi-channel receiver system having an interference mitigation unit, according to embodiments of the present disclosure.

The interference mitigation techniques described above with reference to FIGS. 1-6B can be easily extended to wideband multi-channel receiver architectures that support channelization of a wide band of radio frequencies into multiple wide band chunks. FIG. 7 illustrates a wideband direct sampling multi-channel receiver system, generally designated 40, according to embodiments of the present disclosure. The receiver system 40 preferably includes an antenna unit 41, a channel selector 44, RF front-end 45, an interference mitigation unit 52, an RF back-end 53, an interference detector 60, and a processing unit 62.

The antenna unit 41 includes one or more antennas 42(1)-42(k) configured to receive signals across a wide band of frequencies. In certain embodiments, each of the antennas 42(1)-42(k) may be configured to receive radio signals across the same entire wide band of frequencies, while in other embodiments, each of the antennas 42(1)-42(k) is configured to receive radio signals across different respective wide band portions of the wide band of frequencies. The antenna unit 41 is in signal communication with the channel selector 44 and the interference detector 60 via a directional coupler, router, power splitter, RF switch, or any other signal routing mechanism that can transfer the electromagnetic radiation received by the antenna unit 41 to the channel selector 45 and the interference detector 60.

The channel selector 44 provides signal communication between the antenna unit 41 and the RF front-end 45, and is configured to select signals from at least some of the one or more antennas 42(1)-42(k), and providing those selected signals to the RF front-end 45. For example, the channel selector 44 may select signals from antennas 42(1), 42(2), or may select signals from the last antenna 42(k). The channel selector 44 can be implemented in various ways. In one non-limiting implementation, the channel selector 44 is implemented as an RF router, while in another non-limiting implementation, the channel selector 44 is implemented as a multi-RF switch matrix. In yet another non-limiting implementation, the channel selector 44 is implemented as a passive signal splitting network, while yet further non-limiting implementations, the channel selector 44 is implemented as a switching network. It should be apparent that above-described implementations are merely illustrative examples of some of the possible implementations of the channel selector 44, and additional implementations are possible as is understood by those skilled in the art. The channel selector 44 may be controlled by the processing unit 62 or another processing or control system linked to the receiver system 40.

In certain embodiments, the RF front-end 45 is generally configured to channelize the signals received from the channel selector 44 into multiple channels covering different respective wide band chunks. In the illustrated example, the RF front-end 45 is configured to channelize the signals into N channels where each channel has its own channel bandwidth. The channelization is effectuated by a plurality of band-pass filters 46(1)-46(N) having different respective pass bands (corresponding to different channels) that are configured to filter signals from the channel selector 44 to select different respective wide band chunks from the channel selector 44 by passing signals in the respective pass bands, and reject signals outside of the selected pass bands. In other embodiments, the band-pass filters 46(1)-46(N) are configured to reject out-of-band interference. The pass-bands of the band-pass filters 46(1)-46(N) may be configured (i.e., set) by the processing unit 62 or another processing or control system linked to the receiver system 40.

A plurality of LNAs 48(1)-48(N) are in signal communication with the respective band-pass filters 46(1)-46(N). Each of the LNAs 48(1)-48(N) is configured to increase the signal strength of the filtered signals from the corresponding band-pass filter 46(1)-46(N) and to prevent noise in subsequent stages from contributing materially to signal sensitivity. Similar to as in the receiver 10, the LNAs 48(1)-48(N) provide the target noise figure (NF) of the RF chain and therefore defines the receiver sensitivity. The amplification level imparted by the LNAs 48(1)-48(N) may be configured (i.e., set) by the processing unit 62 or another processing or control system linked to the receiver system 40.

A plurality of LNA bypass switches 50(1)-50(N) are deployed in the respective signal paths parallel to respective LNAs 48(1)-48(N). The bypass switches 50(1)-50(N) are configured to selectively bypass the corresponding LNAs 48(1)-48(N) in response to controlled signal input which opens the switches. When the switches 50(1)-50(N) are closed, the filtered signals from the band-pass filters 46(1)-46(N) bypass the LNAs and propagate directly to the interference mitigation unit 52. When the bypass switches 50(1)-50(N) are closed, the filtered signals from the band-pass filters 46(1)-46(N) are amplified by the LNAs and then propagate to the interference mitigation unit 52. The bypass switches 50(1)-50(N) are preferably independently controllable, such that one of the switches can be open while another of the switches can be closed. In certain embodiments, the bypass switches 50(1)-50(N) form part of an AGC system of the receiver 40. The AGC system is formed from multiple AGC units, preferably one-per-channel, which include attenuators 54(1)-54(N) and preferably amplifiers 56(1)-56(N) in the RF back-end 53, as will be discussed further below. In situations in which a strong desired signal or strong undesired signal is received in a particular channel, the AGC system is configured to open the bypass switch of that channel to avoid amplifying the strong signal by the LNA.

The interference mitigation unit 52 is in signal communication with the LNAs 48(1)-48(N) and is configured to filter the amplified and filtered signals received from the LNAs 48(1)-48(N) to produce a set of filtered signals in which any undesired signals in a particular channel are attenuated to reduce the PR below a threshold value to prevent triggering the AGC unit of the corresponding channel to attenuate desired signals in the channel below a threshold value that would result in suppression of the desired signals at the AGC output. The interference mitigation unit 52 is generally similar to the interference mitigation unit 110 describe above, but preferably includes one or more tunable filter banks for each specific channel (i.e., at least one set of one or more tunable filters). For example, for a two-channel receiver, the first channel may have one or more corresponding tunable filter banks, and the second channel may have one or more corresponding tunable filter banks. Each of the filter banks can be implemented as a bank of one or more tunable band-stop filters and/or a bank of one or more tunable notch filters and/or a bank of one or more tunable band-pass filters, all as described above with reference to FIGS. 2-5B. The attenuation of the undesired signals in the corresponding channels is effectuated by tuning the tunable filters of the filter bank of the corresponding channel according to signal characteristics of the undesired signal.

The undesired signals are identified, and their signal characteristics are extracted, by cooperation between the interference detector 60 and the ADC 64A and DPS 66A of the processing unit 62. In certain embodiments, the interference detector 60 is implemented as the RF unit 204 of the receiver 200, so as to include a band-select filter, amplifier, and anti-aliasing filter. In such embodiments, the interference detector 60, ADC 64A and DPS 66A may form part of an auxiliary receiver (together with one or more antennas) that is separate from a primary receiver formed from the antenna unit 41, channel selector 44, RF front-end 45, interference mitigation unit 52, RF back-end 53, and the ADCs and DPSs of the processing unit 62 that are configured to digitize and process the received signals to recover desired signals.

In general, the interference detector 60 is configured to receive signals from the antennas 42(1)-42(k) and to filter the signals from the antenna antennas 42(1)-42(k), e.g., via a band-select filter, in order to select a selected wide band of signals. The filtered signals are amplified and filtered (via a gain block (e.g., gain block 208) and AAF (e.g., AAF 216)), and are then fed to the ADC 64A of the processing unit 62, which digitizes the amplified and filtered signals. The DPS 66A processes the digitized signals using the techniques discussed above (e.g., FFT and $I^2+Q^2$) in order to identify undesired signals in the selected wide band channel and extract signal information (characteristics) of those identified undesired signals. The processing unit 62 provides control signals to the interference mitigation unit 52 via control line 67 in order to tune the respective filter banks.

The interference mitigated signals (i.e., the signals that have been filtered by the interference mitigation unit 52) are passed to the RF back-end 53, which includes the attenuators 54(1)-54(N) which form part of the AGC units of the respective channels. The AGC units are generally configured to produce gain adjusted versions of the filtered signals received from the interference mitigation unit 52. Control of the AGC is preferably provided by the processing unit 62. The attenuators 54(1)-54(N) are configured to attenuate the filtered signals from the interference mitigation unit 52. In certain non-limiting implementations, the attenuators 54(1)-54(N) are implemented as DCAs, while in other non-limiting implementations, the attenuators 54(1)-54(N) are implemented as VVAs that is controlled by generating a control voltage using a digital-to-analog converter.

The plurality of amplifiers 56(1)-56(N) are in signal communication with the respective the attenuators 54(1)-54(N). Each of the amplifiers 56(1)-56(N) is configured to increase the signal strength of the attenuated signals from the attenuators 54(1)-54(N). In preferred but non-limiting embodiments, the amplifiers 56(1)-56(N) are implemented as gain blocks.

A plurality of band-pass filters 58(1)-58(N) are in signal communication with the respective the amplifiers 56(1)-56(N). The band-pass filters 58(1)-58(N) provide further out-of-band noise rejection by filtering signals from the amplifiers 56(1)-56(N) by passing signals in the pass bands of the respective band-pass filters 58(1)-58(N) and rejecting signals outside of the pass bands. The pass-bands of the band-pass filters 58(1)-58(N) may be configured (i.e., set) by the processing unit 62 or another processing or control system linked to the receiver system 40.

Although not shown in the drawings, a plurality of anti-aliasing filters (implemented as low-pass or band-pass filters) may be in signal communication with the respective band-pass filters 58(1)-58(N) in order to pass frequencies that are below the Nyquist bandwidth associated with the sampling rate of the ADC associated with the respective channel.

Turning now to the processing unit 62, a plurality of ADCs 64(1)-64(N) are in signal communication with the respective band-pass filters 58(1)-58(N) (or anti-aliasing filters). In the illustrated embodiment, each channel has its own ADC which is configured to digitize the filtered signals received from the corresponding band-pass filter (or anti-aliasing filter). The ADCs 64(1)-64(N) are preferably high-speed high-dynamic-range ADC, similar to the ADC 120. The digitized signals from each channel are passed to respective DPSs 66(1)-66(N), which process the digitized signals. Each of the DPSs 66(1)-66(N) is generally similar to the DPS 122, and preferably includes a modem for demodulating, decoding and generating digitized baseband signals in the corresponding channel, and a processor for processing the digitized baseband signals of that channel to recover desired signals in the channel.

The processors of the processing unit 62 can be implemented in various ways. In one non-limiting example, the processors are implemented as a DSP in an application specific integrated circuit (ASIC). In another non-limiting example, the processors are implemented as field programmable gate arrays (FPGAs). It is further noted that although the receiver system 40 is illustrated in FIG. 7 as having a separate DPS for each channel, other embodiments are possible in which processing is shared between channels. In one extreme case, a single DPS is utilized for processing digitized signals from all of the ADCs 64(1)-64(N). In another extreme and sometimes preferred case, a single DPS is utilized for processing digitized signals from all of the ADCs 64(1)-64(N), 64A. In such a case, the single DPS performs both demodulation/decoding to recover desired signals, as well as jammer signal identification.

In certain preferred but non-limiting embodiments, the receiver system 40 also includes a management unit 68 that is electronically linked to the processing unit 62, for example via control line 69. The management unit 68 is a computerized module that includes at least one computerized processor, such as a microprocessor, digital signal processor, microcontroller, and the like, linked to a computer storage medium, such a memory. The management unit 68 is configured calculating spurs resultant from system clocks and other non-linear effects from system clocks or received RF signals (including both desired and undesired signals). One example of spurs that can occur in the receiver system 40 may arise from the high-speed high-dynamic-range ADCs of the processing unit 62. In order to achieve high clock rate without compromising on dynamic range, such ADCs typically utilize interleaving techniques, which tend to generate interleaving spurs. In general, the management unit 68 is configured to calculate spurs and to configure filters of the one or more DPSs 66(1)-66(N), 66A to filter the calculated spurs, thereby mitigating spurious effects.

It is noted that in certain embodiments, the band-select filter of the interference detector 60 can be configured to cycle through multiple wide frequency bands associated with each of the channels, i.e., the pass bands of the band-pass filters 46(1)-46(N) so as to scan the different channels of the wide band in order to provide band-selected signals corresponding to each of the channels to the processing unit 62 thereby enabling the processing unit 62 (e.g., the DPS 66A) to identify jammer signals in each respective scanned channel. In other embodiments, each channel can include a pair of band-pass filters (e.g., two band-pass filters 46(1), two band-pass filters 46(2), etc.), where for each channel the processing unit 62 processes filtered signals from one of the band-pass filters associated with the channel to recover (demodulate and decode) desired signals in that channel, and the processing unit 62 processes filtered signals from the other of the band-pass filters associated with the channel to identify jammer signals (and jammer signal characteristics) in that channel. The processing of the filtered signals from the two band-pass filters of the same channel may be performed by different component combinations of the processing unit 62. For example, a first ADC-DPS pair can perform digitization and signal processing to recover desired signals in the channel, and a second ADC-DPS pair can perform digitization and signal processing to identify jammer signals in the channel.

The following paragraphs describe the configuration of the tunable filters of the interference mitigation unit 52 (and/or 110) during operation of the receiver system 40

(and/or 10) to receive wide band signal transmissions. In one non-limiting example, the signal transmissions include communications transmissions from a cooperative transmitter, where the transmitter and the receiver form a communication link of a communication network. The cooperative communications transmissions include the desired signals, which are transmitted as part of communication frames, which the receiver system attempts to receive and recover. Each such communication frame may be a part of a communication dwell that consists of multiple communication frames. Each such dwell is generally a duration limited waveform signal that is generated by modulating and encoding information for transmission over a communication medium (i.e., a communication channel such as a wireless channel, satellite channel, etc.). The information that is modulated and encoded may include payload data (also referred to as "message" data) as well as information required for proper operation of the communication link, including, for example, synchronization and header data. Each communication frame of a communication dwell is generally defined as one or more time-segments (i.e., signaling interval) of the communication dwell that comprises "symbols". A "symbol" generally refers a segment of time of a communication frame in which the associated segment of the waveform signal is generated according to a set of bits.

Figure 8:
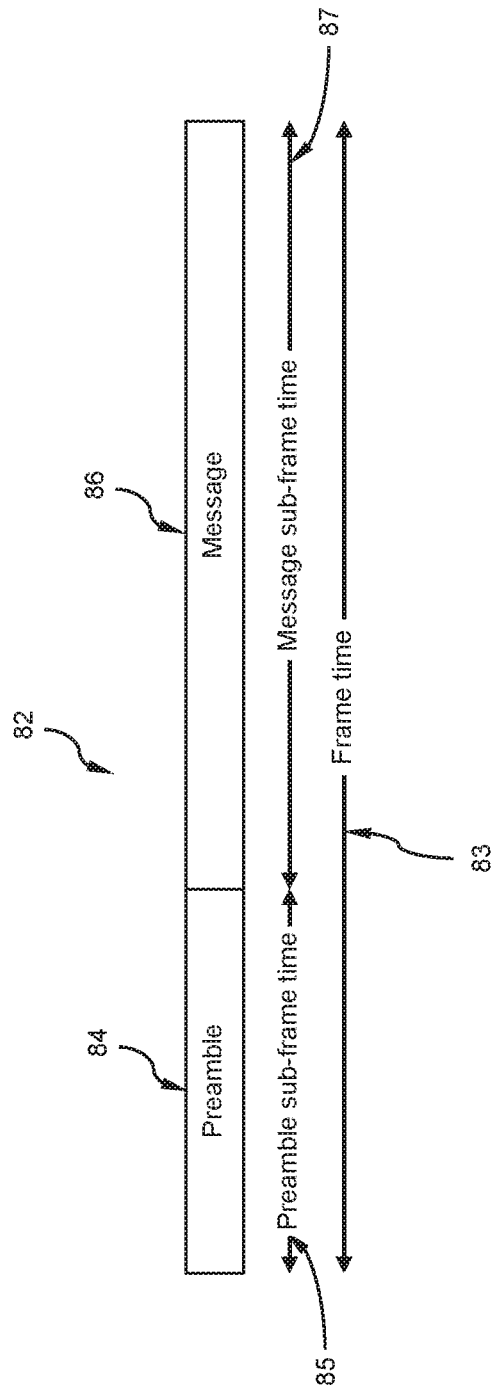
FIG. 8 is an exemplary communication frame that can be received by the wideband multi-channel receiver system of FIG. 7 or the wideband receiver system of FIG. 1.

Referring now to FIG. 8, there is shown a non-limiting example of a transmitted communication frame 82 that is to be received by the receiver system 40. The communication frame 82 has an associated frame time 83 corresponding to the signaling interval over which the communication frame is transmitted. Each communication frame 82 is sub-divided into sub-frames containing different portions of the communication frame 82. Here, the communication frame 82 is sub-divided into two sub-frames, namely a preamble sub-frame 84 having a plurality of preamble symbols, and a message sub-frame 86 (also referred to as a "payload") having a plurality of message symbols. The preamble 84 is typically much shorter than the message 86 (i.e., the preamble contains many fewer symbols than the message). The sub-frames 84, 86 have associated sub-frame times 85, 87 which correspond to the signaling interval over which the sub-frames are transmitted. Since the preamble 84 is shorter than the message 86, the preamble sub-frame time 85 is likewise shorter than the message sub-frame time 87. In conventional communications systems, the preamble 84 is typically used for receiver synchronization. In the present embodiments, the preamble sub-frame time 85 can be additionally used to configure the tunable filters of the interference mitigation unit and/or the AGC system. In one non-limiting example, during the preamble frame time 85 the relevant DPS is configured to process digitized received signals using the techniques discussed above (e.g., FFT and $I^2+Q^2$) in order to identify undesired signals in the selected wide band channel and extract signal information (characteristics) of those identified undesired signals. During the preamble sub-frame time 85, the relevant DPS may also tune (i.e., configure) one or more of the tunable filters based on the signal characteristics of the identified undesired signal. Alternatively, or in addition to the above, the relevant DPS may configure the relevant AGC to attenuate and/or amplify received signals during the preamble sub-frame time 85.

During the message sub-frame time 87, the receiver system continually receives signals, across the wide band, while monitoring the received signals in order to identify undesired signals (and their signal characteristics) that pop up (i.e., occur) during transmission of the message frame 86. In particular, the relevant DPS processes digitized received signals during the message sub-frame time 87 using the techniques discussed above (e.g., FFT and $I^2+Q^2$) in order to identify undesired signals in the selected wide band channel and extract signal information (characteristics) of those identified undesired signals that pop up during the message sub-frame time 87 which might interfere with the message frame 86. During the message sub-frame time 87, the relevant DPS tunes (i.e., configures) the relevant tunable filters according to the extracted signal characteristics and/or controls the AGC system to make gain adjustments to the received signals to mitigate the effects of the identified undesired signals that pop up during the message sub-frame time 87. As a consequence, an undesired signal, which is not synchronized to the preamble 84 during the preamble sub-frame time 85, will not destroy the entire communication frame 82, and the AGC system will be able to maintain gain settings while mitigating the effects of the undesired signal using continuous monitoring during the message sub-frame time 87.

Figure 9:
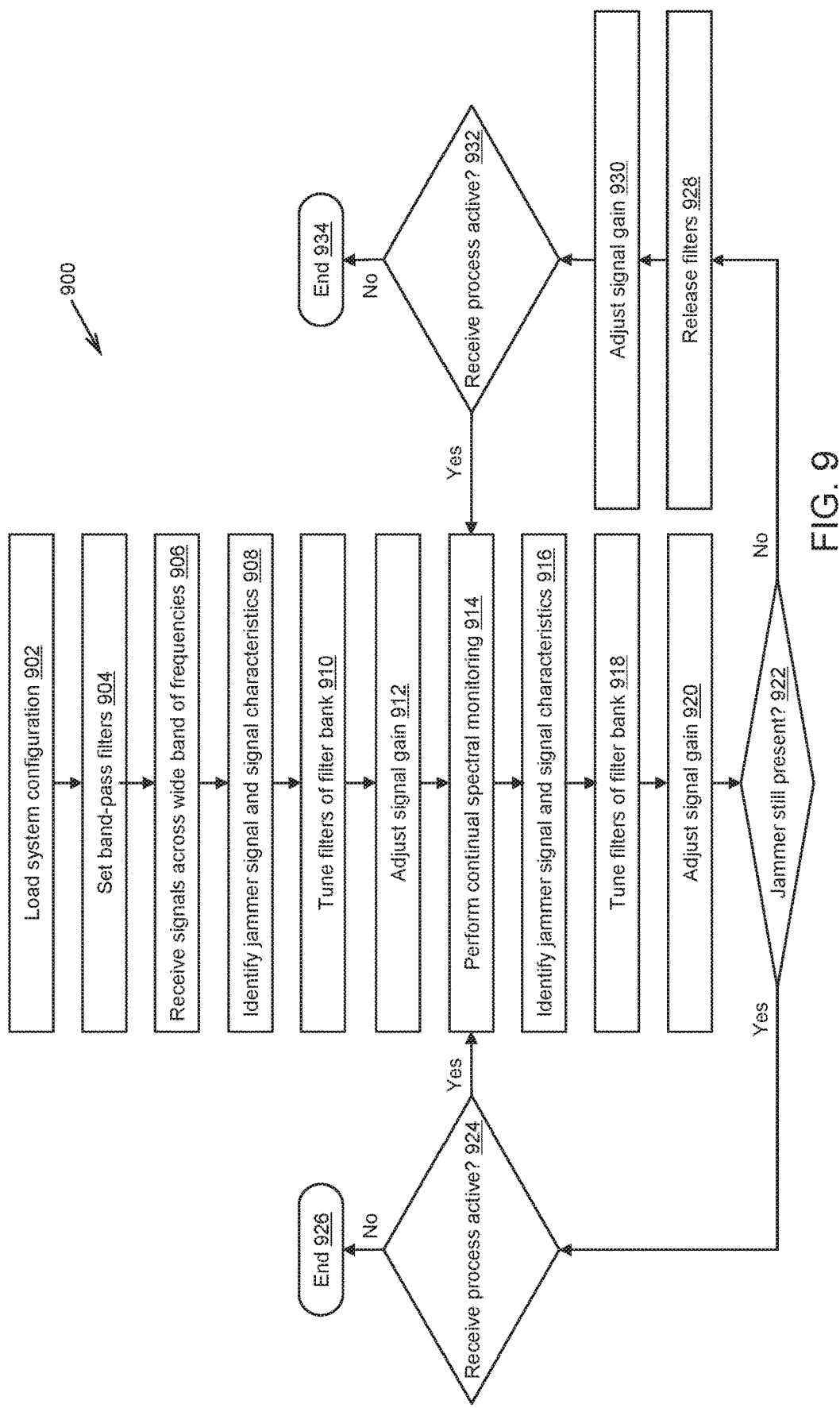
FIG. 9 is a flow diagram illustrating a process for receiving signals using the wideband receiver system of FIG. 7.

Attention is now directed to FIG. 9, which shows a flow diagram detailing a process (i.e., a method) 900 for receiving signals using a wideband receiver system according to embodiments of the present disclosure. Reference is also made to FIGS. 1-8. The process 900, and its sub-processes, are performed by the receiver system and its associated components, and are performed automatically and preferably in real-time. For clarity of illustration, the steps of the signal receiving process 900 are described within the context of using the receiver system 40, however it is noted that the steps can be augmented for use with other wide band receiver systems according to embodiments of the present disclosure, such as the receiver system 10. It is also noted that certain steps of the signal receiving process 900 are described within the context of receiving communication signals, in particular communication frames such as the communication frame 82 of FIG. 8. It is noted however that these steps can be easily augmented so as to encompass receiving any signals for which interference from undesired signals may be present.

The process 900 begins at step 902, where receiver system configuration parameters are loaded into the receiver system, for example via system software (SW) and/or system firmware (FW) that is executed by one or more processors of the receiver system (such as the processors of the processing unit 62). The system configuration parameters include, for example, channel definitions (i.e., pass bands of the band-pass and band-select filters) including the particular channel (or channels) in which desired signals reside. The channel definition of a particular channel can include, for example, the center frequency and/or bandwidth of the desired signal of the channel. The bandwidth of the desired signal can be determined based on the data-rate (which can be symbol rate or bit rate) or can be determined based on the occupation of the portion of the wide band in which the desired signal resides. The system configuration parameters can also include, in addition to channel definitions, the state of the receiver system or the state of a transceiver system that employs a receiver system architecture according to the embodiments of the present disclosure. The transceiver state refers to the operating state of the transceiver, i.e., the configuration of the transceiver as a receiver or the configuration of the transceiver as a transmitter. When configured as a receiver, the transceiver state preferably also includes the receiver frequency band (i.e., the wide band of frequencies across which the receiver is to receive signals). When configured as a transmitter, the transceiver state preferably also includes the transmitter frequency band (i.e., the wide band of frequencies in which the desired signals can reside).

The process 900 then moves to step 904, where the processing unit 902 sets frequency bands of interest according to the channel definitions of the system configuration parameters loaded in step 902. In certain embodiments, the frequency bands of interest are set using the band-pass filters 46(1)-46(N). In such embodiments, the band-pass filters 46(1)-46(N) receive common input from the antenna unit 41 and perform channelization so as to sub-divide the received RF wide band into N RF channels where each RF channel is sampled by a corresponding one of the ADCs 64(1)-64(N). The bandwidths of the band-pass filters 46(1)-46(N) can be wide or relatively narrow for better selectivity. In other embodiments, the frequency bands of interest are set using a switched bank of band-pass filters connected to a common input of the antenna unit 41 and connected to a common output in the form of an RF selector switch. The RF selector switch can then select the band-pass filter output from which to further propagate signals along the RF chain. Control of the RF selector switch can be provided by the processing unit 62 or another processing or control system linked to the receiver system 40.

Once the frequency bands of interest are set, the process 900 moves to step 906, where the receiver system 40 begins receiving signals across the wide band of radio frequencies and continues to receive signals over the duration of a receiving interval, which when performed within the context of the communication frame 82 of FIG. 8, includes at least the frame time 83 consisting of the preamble sub-frame time 85 and the message sub-frame time 87. While the receiver system 40 receives signals over the duration of the receiving interval, the receiver system 40 is said to be performing a "receive process" or a "receiving process". The receive process includes the antennas of the antenna unit receiving the electromagnetic radiation corresponding to the signals, and the antenna unit providing the received electromagnetic radiation to the RF front-end 45 (for example via the channel selector 44). During an initial period of the receive process, the AGC system of the receiver system 40 can also be configured based on initial signal power values. In certain embodiments, the initial period of the receive process coincides with receipt of the preamble of a communication frame, such as the preamble symbols 84 of the communication frame 82 described above with reference to FIG. 8.

The process 900 then moves to step 908, where the receiver system 40 processes received signals in order to identify jammer signals in the wide band. In certain embodiments, the processing of received signals to identify jammer signals at step 908 is performed during the preamble sub-frame of the communication frame.

Parenthetically, this process of receiving and processing signals to identify jammer signals can also be referred to as "sniffing", and can be performed using an auxiliary receiver or primary receiver, as discussed above. It is also noted that the sniffing process is performed continually throughout the duration of the message sub-frame in order to identify new jammer signals that pop up during the message sub-frame time, as will be discussed below.

In certain embodiments, the interference detector 60 provides received RF signals in a particular frequency band (such as the band in which the desired signal resides) to the ADC 64A which digitizes the RF signals. The DPS 66A then processes the digitized signals using, for example, FFT and $I^2+Q^2$, in order to identify an undesired signal(s) in the selected band and extract signal information (characteristics) of the identified undesired signal(s).

At step 910, one or more filters of the filter bank of the interference mitigation unit 52 are tuned (i.e., configured) based at least in part on the signal information associated with the identified jammer signal(s). The tuning is preferably controlled by the processing unit 62, but may be controlled by another processing or control system linked to the receiver system 40. Detailed steps for configuring the filters will be described in further detail below with reference to FIGS. 10 and 11.

The process 900 then moves to step 912, where the AGC system adjusts the gain of the filtered signals received from the interference mitigation unit 52. As discussed above, once the filters of the filter bank are tuned, the power of the undesired signal is reduced (below a threshold value) such that the AGC system does not suppress the desired signal, thereby maintaining the SNR of the desired signal above an acceptable threshold level. In certain embodiments, the AGC applies gain adjustment by attenuating the identified undesired signal and amplifying the desired signal in order to increase SNR. The gain adjustment may be provided by a look up table (LUT) having entries indicating switch point for gain states versus signal input power. Subsequent to gain adjustment, the gain adjusted signals propagate through the remainder of the RF chain (e.g., the RF back-end 53) and are digitized by one or more ADCs 64(1)-64(N) and processed by one or more DPSs 66(1)-66(N) to demodulate and decode the digitized signals to generate digitized baseband signals, and to recover desired signals from the digitized baseband signals. When utilized in the context of a communication frame, such as the communication frame 82 described above with reference to FIG. 8, step 912 may be executed during a portion of the preamble sub-frame time 85 and/or during the message sub-frame time 87.

It is generally noted that in certain preferred embodiments, steps 902-912 of the process 900 are performed at the preamble sub-frame 84 of the communication frame 82, during the preamble sub-frame time 85, where in particular, the configuration of filters at step 910 (and as will be described in further detail below with reference to FIGS. 10 and 11) is performed at the preamble sub-frame 84 during the preamble sub-frame time 85.

As mentioned above, it is preferable that the process 900 perform continual spectral monitoring of the wide band in order to identify new (i.e., additional) jammer signals that may pop up during transmission that could interfere with the performance of the receiver system. For example, if a jammer is not synchronized with the preamble sub-frame time 85, new jammer signals which pop up during the message sub-frame time 87 may not be identified by the interference detector 60 if continual spectral monitoring is not performed during the message sub-frame time 87.

The continual spectral monitoring is performed at step 914, where the receiver system 40 continues to receive signals from the entire wide band or one or more portions of the wide band during portions of the receiver interval (e.g., during the message sub-frame time 87). In general, the continual monitoring can be continuous, periodic or intermittent across the entire duration of transmission, for example throughout the entire message sub-frame time 87. For example, the continual monitoring may be continuous (i.e., uninterrupted) throughout the message sub-frame time 87. Alternatively, the continual monitoring may be repeated monitoring over fixed-length and equally-spaced time sub-intervals (e.g., performed for a period of T seconds every r seconds) of the message sub-frame time 87. Further still, the continual monitoring may be repeated monitoring over fixed-length and unequally-spaced time intervals (e.g., performed for a period of T seconds with variable spacing between periods) of the message sub-frame time 87. Further still, the continual monitoring may be repeated monitoring over variable-length and equally-spaced time intervals (e.g., performed for periods of variable time every r seconds) of the message sub-frame time 87. Further still, the continual monitoring may be repeated monitoring over variable-length and unequally-spaced time intervals (e.g., performed for periods of variable time with variable spacing between periods) of the message sub-frame time 87.

During the continual spectral monitoring, the receiver system 40 may identify new jammer signals and signal characteristics, as exemplified at step 916, that pop up during the message sub-frame time 87. Based on the identified jammer signals and their characteristics, the process 900 moves to step 918, where one or more filters of the filter bank of the interference mitigation unit 52 are tuned (i.e., configured) based on the signal information associated with the identified new jammer signal(s). The process 900 then moves to step 920, where the AGC system adjusts the gain of the filtered signals received from the interference mitigation unit 52. In general, steps 916-920 are similar to respective steps 908-912, the details of which will not be repeated here for the sake of brevity.

The process 900 then moves to step 922, where the receiver system 40 determines if any jammer signal is still present during the message sub-frame time 87, and if so, whether the jammer signal is present in band in which the desired signal resides and whether the jammer signal will degrade SNR below an acceptable threshold and/or trigger the AGC to suppress the desired signal. A present jammer signal could be an ongoing jammer signal that was previously identified by the receiver system 40 during the message sub-frame time 87 or at step 908, or a new jammer signal that just began transmitting during a sub-interval of the message sub-frame time 87. If such SNR degrading and/or signal suppressing jammer signals are present, the process 900 moves to step 924, where the receiver system 40 checks whether the receive process is still active (for example, whether the complete message sub-frame 86 associated with the preamble has been received by the receiver system 40). If the receive process is no longer active, the process 900 terminates at step 926. If the receive process is still active, the process 900 returns to step 914 from step 924, where the receiver system 40 continues to monitor the spectrum for potential jammer signals during the message sub-frame time 87.

Returning to step 922, if no jammer signals are present, or if jammer signals are present that will not degrade SNR or induce suppression of the desired signal, the process 900 moves to step 928, where the filters of the interference mitigation unit 52 are released (i.e., the filters are re-configured to pass all frequencies equally without attenuation). The process 900 then moves to step 930, where the AGC system adjusts the gain of the signals received from the RF front-end 45. If using a gain LUT, which may be stored in a memory of the processing unit 62, the gain LUT is preferably updated to include new gain state entries corresponding to the newly adjusted gain. It is noted that the receiver system 40 may determine that a previously identified jammer signal is no longer present by comparing current spectral data with spectral data computed during the presence of the jammer signal. For example, FFT data computed while a jammer signal is present would show peaks at the center frequency of the jammer signal, whereas no peaks or lower signal amplitude would be shown in FFT data computed when the jammer signal is no longer present. In order to compare current FFT data with previously computed FFT data, the processing unit 62 may store computed FFT data in memory.

The process 900 then moves to step 932, where the receiver system 40 checks whether the receive process is still active (similar to as in step 924). If the receive process is no longer active, the process 900 terminates at step 934. If the receive process is still active, the process 900 returns to step 914 from step 932, where the receiver system 40 continues to monitor the spectrum for potential jammer signals.

It is generally noted that in certain preferred embodiments, steps 914-932 of the process 900 are performed at the message sub-frame 86 during the message sub-frame time 87, where in particular, the configuration of filters at step 918 (and as will be described in further detail below with reference to FIGS. 10 and 11) is performed at the message sub-frame 86 during the message sub-frame time 87.

Figure 11:
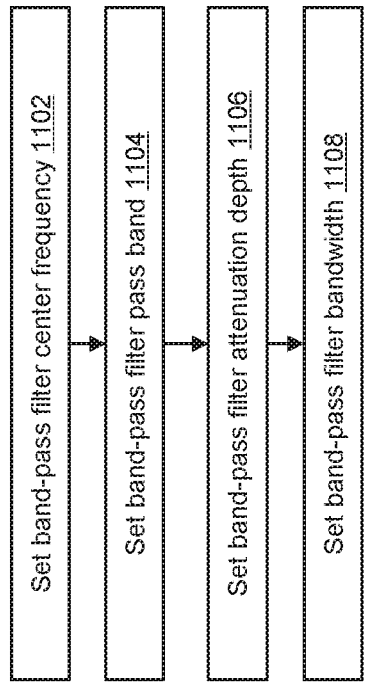
FIG. 11 is a flow diagram illustrating a process for tuning a band-pass filter of the wideband receiver system of FIG. 7 as a sub-process of the process of FIG. 9.
Figure 10:
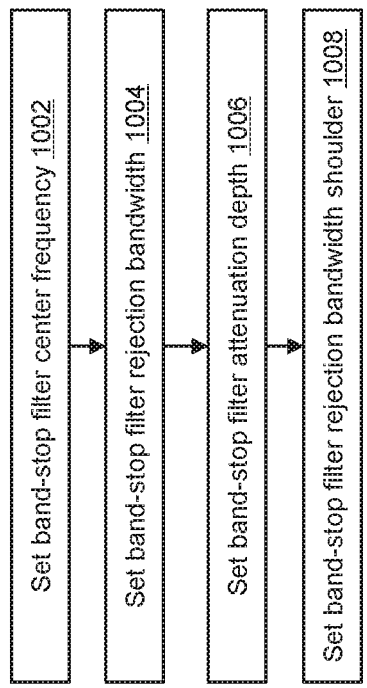
FIG. 10 is a flow diagram illustrating a process for tuning a band-stop filter of the wideband receiver system of FIG. 7 as a sub-process of the process of FIG. 9.

Referring now to FIGS. 10 and 11, there are shown flow diagrams detailing sub-processes of steps 910, 918 of the process 900, for tuning the filters of the filter bank of the interference mitigation unit 52 based (at least in part) on signal characteristics of an identified undesired signal.

FIG. 10 shows steps for tuning a band-stop filter (preferably a notch filter) of the interference mitigation unit 52, similar to as discussed with reference to FIGS. 2-3D. At step 1002 the center frequency of the band-stop filter is set to the center frequency of the identified jammer signal. At step 1004, the rejection bandwidth of the band-stop filter is set to the bandwidth of the undesired signal. At step 1006, the attenuation depth of the band-stop filter is set according to estimated signal power of the undesired signal. At step 1008, the rejection bandwidth shoulder of the band-stop filter can be set according to the center frequency and bandwidth of the desired signal. It is noted that although FIG. 10 illustrates steps 1002-1008 being performed in a particular order, the steps 1002-1008 may in fact be performed in an order different from the order illustrated in FIG. 10. In addition, although FIG. 10 illustrates steps 1002-1008 being performed sequentially, some or all of the steps 1002-1008 may be performed in parallel.

As discussed, the center frequency, bandwidth, and signal power of the undesired signal are determined (at step 908) by performing, for example, FFT and $I^2+Q^2$. In certain embodiments, the attenuation depth is set at step 1006 based on the power estimation of the undesired signal and the protection ratio at the input to the band-stop filter. As discussed, in preferred embodiments, the configuration of the band-stop filter prevents suppression of the undesired signal by the AGC system. In addition to the suppression prevention, the configuration of the band-stop filter prevents the identified undesired signal from blocking the desired signal, thereby maintaining the SNR of the desired signal—at the input to the relevant one of the ADCs 64(1)-64(N)—above a minimum threshold level.

FIG. 11 illustrates steps for tuning a band-pass filter of the interference mitigation unit 52, similar to as discussed with reference to FIGS. 4-5B. The use of band-pass filters as part of the filter bank may effectuate increased band-selectivity for a desired signal in the channel associated with the selected band, and/or may effectuate increased band-selectivity for a specific desired channel associated with the selected band in which the desired signal resides. At step 1102 the center frequency of the band-pass filter is set to the center frequency of the desired signal. At step 1104, the pass band of the filter (e.g., pass band 36a in FIG. 5A) is set according to the bandwidth of the desired signal in order to receive the entire signal energy of the desired signal. The bandwidth of the desired signal can be determined using various spectral analysis techniques, including performing FFT. At step 1106, the attenuation depth of the band-pass filter is set based on the estimated signal power of the undesired signal. At step 1108, bandwidth of the filter (e.g., bandwidth 34a in FIG. 5A) is set according to the bandwidth of the identified jammer signal in order to prevent undesired signals in spectral proximity to the desired signal from leaking through the pass band of the filter. It is noted that although FIG. 11 illustrates steps 1102-1108 being performed in a particular order, the steps 1102-1108 may in fact be performed in an order different from the order illustrated in FIG. 11. In addition, although FIG. 11 illustrates steps 1102-1108 being performed sequentially, some or all of the steps 1102-1108 may be performed in parallel.

In certain embodiments, the attenuation depth is set at step 1106 based on the power estimation of the undesired signal and the protection ratio at the input to the band-pass filter. As discussed, in preferred embodiments, the configuration of the band-pass filter prevents suppression of the undesired signal by the AGC system. In addition to the suppression prevention, the configuration of the band-pass filter prevents the identified undesired signal from blocking the desired signal, thereby maintaining the SNR of the desired signal— at the input to the relevant one of the ADCs 64(1)-64(N)— above a minimum threshold level.

As discussed, in certain embodiments the interference mitigation unit 52 employs a combination of band-stop filters and band-pass filters. In such embodiments, the steps for configuring the filters described above with reference to FIG. 9 (at steps 910 and 918) and FIGS. 10 and 11, can be executed as part of a single process, optionally with some or all of the steps executed in parallel.

As previously mentioned, multiple communication frames are often transmitted as part of a single communication dwell. Furthermore, communication transmissions between a transmitter and a receiver often extend for multiple communication dwells, typically on the order of hundreds of dwells, consisting of several hundreds or thousands of communication frames. Therefore, the steps of the process 900 can be executed for each communication frame of each communication dwell throughout the transmission process between a transmitter and the receiver system.

As previously mentioned, the receiver systems of the present disclosure have many useful applications, and may be used to advantage when applied within the context of communications systems, EW systems, and RADAR systems. In one non-limiting example of an application of the present disclosure, the receiver system (10 and/or 40) is deployed as part of a satellite communications system, such as a military satellite communications system. In such an example, the receiver system may be deployed as part of a ground station transceiver configured to receive downlink signals from a satellite and transmit uplink signals to a satellite, or may be deployed as part of a satellite transceiver that is configured to receive uplink signals from, and transmit downlink signals to, a ground station and/or receive crosslink signals from, and transmit crosslink signals to, another satellite in a satellite constellation. It is generally known that military communication satellite systems are frequently subjected to jammer signals from adversaries and employ countermeasure techniques to combat jammers, including, for example, nulling antennas and frequency hopping. The interference mitigation methodologies described herein can be used instead of such countermeasures, or more preferably in combination with such countermeasures so as to provide supplementary jammer countermeasure capabilities. It is noted that satellite communication systems may also be subjected to co-channel interference and/or adjacent channel interference, the effects of which can be mitigated by utilizing the interference mitigation methodologies of the present disclosure.

It is further noted that non-satellite communications systems, such as mobile communications systems or wireless communications systems, may also be subjected to jamming (in particular when used in a military context), and/or adjacent channel interference, and/or co-channel interference. Therefore, the in another non-limiting example, the receiver system (10 and/or 40) is deployed as part of a mobile communications transceiver so as to mitigate the effects of such jammers and/or interference.

In another non-limiting example of an application of the present disclosure, the receiver system (10 and/or 40) is deployed as part of an electronic countermeasures system in a non-communication context in order to provide anti-jamming capability. In one example, the electronic countermeasures system is an electronic counter-countermeasures system of an electronic warfare (EW) system. In another example, the electronic countermeasures system is part of a RADAR system.

As should be apparent to those of skill in the art, the above examples of potential applications of the receiver systems of the present disclosure are a non-exhaustive list of potential applications, and the receiver systems of the present disclosure may have other suitable applications.

In certain preferred but non-limiting implementations, the receiver systems according to the embodiments of the present disclosure are implemented as part of software defined radio (SDR) receivers, whereby the filters, amplifiers, attenuators, ADCs, and DPSs are implemented in software or system firmware, allowing seamless command and control of the various system components by computer processors and and/or controllers, such as the processors of the various process units 118, 218, 62.

Implementation of the systems and/or methods of embodiments of the disclosure can involve performing or completing selected tasks implemented by hardware, by software or by firmware or by a combination thereof. For example, hardware for performing selected tasks according to embodiments of the disclosure could be implemented as a chip or a circuit. As software, selected tasks according to embodiments of the disclosure could be implemented as a plurality of software instructions being executed by a computer using any suitable operating system. In certain embodiments of the disclosure, one or more tasks according to exemplary embodiments of systems and/or methods as described herein are performed by a computerized data processor that can execute a plurality of instructions. Optionally, the data processor includes a volatile memory for storing instructions and/or data and/or a non-volatile storage, for example, non-transitory storage media such as a magnetic hard-disk and/or removable media, for storing instructions and/or data.

For example, any combination of one or more non-transitory computer readable (storage) medium(s) may be utilized in accordance with the above-listed embodiments of the present disclosure. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of machine-implemented methods are provided herein, some of which can be performed by various embodiments of systems described herein and some of which can be performed according to instructions stored in non-transitory computer-readable storage media described herein. Still, some embodiments of machine-implemented methods provided herein can be performed by other systems and can be performed according to instructions stored in computer-readable storage media other than that described herein, as will become apparent to those having skill in the art with reference to the embodiments described herein. Any reference to systems and computer-readable storage media with respect to machine-implemented methods is provided for explanatory purposes, and is not intended to limit any of such systems and any of such non-transitory computer-readable storage media with regard to embodiments of computer-implemented methods described above. Likewise, any reference to machine-implemented methods with respect to systems and computer-readable storage media is provided for explanatory purposes, and is not intended to limit any of such computer-implemented methods disclosed herein.

The block diagrams and flowcharts in the drawings illustrate the architecture, functionality, and operation of possible implementations of systems and/or methods according to various embodiments of the present disclosure. In this regard, each block in the block diagrams or flowcharts may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form, "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:
1. A receiver system, comprising:
at least one antenna for receiving a plurality of signals, including a desired signal, across a wide band of frequencies;
at least one tunable filter in signal communication with the at least one antenna for filtering the plurality of signals to produce a plurality of filtered signals;
gain control circuitry in signal communication with the at least one tunable filter for producing a gain adjusted version of the filtered signals at an output of the gain control circuitry; and
a processing unit configured to process received signals in a portion of the wide band to extract signal characteristics of at least one undesired signal in the portion of the wide band, wherein the at least one tunable filter is tuned based at least in part on the signal characteristics of the at least one undesired signal, extracted by the processing unit, to maintain a signal-to-noise ratio of the desired signal above a threshold level at output of the gain control circuitry.

2. The receiver system of claim 1, wherein the at least one antenna, the at least one tunable filter, and the gain control circuitry form part of a primary receiver, and wherein the processing unit forms part of an auxiliary receiver that is separate from the primary receiver.

3. The receiver system of claim 2, wherein the auxiliary receiver includes: at least one antenna for receiving signals in the wide band, and wherein the processing unit includes: an analog-to-digital converter in signal communication with the at least one antenna of the auxiliary receiver for converting the signals received by the at least one antenna of the auxiliary receiver to a plurality of digital signals, and a digital processing system in signal communication with the analog-to-digital converter for evaluating power and frequency values of the plurality of digital signals.

4. The receiver system of claim 2, wherein the primary receiver includes a processing unit that includes: an analog-to-digital converter in signal communication with the gain control circuitry for converting the gain adjusted version of the filtered signals into a plurality of digital signals, and a digital processing system in signal communication with the analog-to-digital converter of the primary receiver for demodulating and decoding the plurality of digital signals so as to recover the desired signal.

5. The receiver system of claim 2, wherein the primary receiver includes a processing unit configured to: receive, from the processing unit of the auxiliary receiver, the signal characteristics of the at least one undesired signal extracted by the processing unit of the auxiliary receiver, and tune the at least one tunable filter based on the signal characteristics received from the processing unit of the auxiliary receiver.

6. The receiver system of claim 1, wherein the desired signal includes message symbols transmitted during a signaling interval, and wherein the at least one tunable filter is tuned during the signaling interval.

7. The receiver system of claim 6, wherein the gain control circuitry produces a gain adjusted version of the filtered signals during the signaling interval.

8. The receiver system of claim 1, wherein the processing unit includes:
an analog-to-digital converter in signal communication with the gain control circuitry for converting the gain adjusted version of the filtered signals into a plurality of digital signals, and
a digital processing system in signal communication with the analog-to-digital converter for demodulating and decoding the plurality of digital signals so as to recover the desired signal.

9. The receiver system of claim 1, wherein the at least one tunable filter includes at least one notch filter.

10. The receiver system of claim 9, wherein the at least one notch filter is tuned by adjusting one or more tuning parameters including one or more of: center frequency, rejection bandwidth, rejection bandwidth shoulder, and attenuation depth.

11. The receiver system of claim 1, wherein the at least one tunable filter includes at least one band-pass filter.

12. The receiver system of claim 1, further comprising: a band-pass filter in signal communication with the at least one antenna configured to select a band of signals from the at least one antenna.

13. The receiver system of claim 12, further comprising: a low-noise amplifier in signal communication with the band-pass filter for producing an amplified version of the signals in the selected band.

14. The receiver system of claim 1, wherein the signal characteristics of the at least one undesired signal includes at least one of power or frequency values of the at least one undesired signal.

15. The receiver system of claim 1, wherein the at least one tunable filter is tuned so as to attenuate the at least one undesired signal sufficient to prevent adjusting the gain of the desired signal below a threshold level.

16. The receiver system of claim 1, wherein the desired signal is in the portion of the wide band of frequencies.

17. The receiver system of claim 1, wherein the wide band covers a bandwidth of at least 100 MHz.

18. The receiver system of claim 1, wherein the wide band covers a bandwidth of at least 400 MHz.

19. A wideband multi-channel receiver system, comprising:
one or more antennas for receiving a plurality of signals across a wide band of frequencies;
a plurality of band-pass filters in signal communication with the antenna unit, each of the band-pass filters configured to receive signals from some of the one or more antennas, the band-pass filters having different respective passbands and each band-pass filter configured to filter the signals from the some of the one or more antennas to produce a set of first filtered signals in the passband of the band-pass filter;
an interference mitigation unit including at least one set of one or more tunable filters in signal communication with the band-pass filters configured to filter each set of the first filtered signals received from the band-pass filters to produce a corresponding set of second filtered signals;
a plurality of gain control units in signal communication with the interference mitigation unit, each gain control unit configured to produce a gain adjusted version of signals for each set of second filtered signals; and
a processing unit configured to process the plurality of signals across the wide band of frequencies so as to: identify at least one undesired signal in the pass-band of one of the band-pass filters, and extract signal information associated with the at least one undesired signal,
wherein at least one of the tunable filters is tuned based at least in part on the signal information, extracted by the processing unit, associated with the at least one undesired signal to maintain a signal-to-noise ratio of a desired signal in the pass-band of the one of the band-pass filters above a threshold level at an output of a corresponding one of the gain control units.

20. A method for receiving signals, the method comprising:
receiving signals, at one or more antenna, across a wide band of frequencies during a frame time associated with a communication frame of a desired signal;
continually monitoring the received signals by processing the received signals that are received during a message sub-frame time of the communication frame to: i) identify one or more undesired signal in the wide band of frequencies that occur during the message sub-frame time, and ii) extract signal characteristics of the one or more undesired signal;
tuning at least one tunable filter based at least in part on the extracted signal characteristics of the one or more undesired signal and filtering the received signals by passing the received signals through the at least one tunable filter to produce filtered signals; and passing the filtered signals through gain control circuitry to produce a gain adjusted version of the filtered signals, wherein the at least one tunable filter is tuned based at least in part on the extracted signal characteristics of the one or more undesired signal so to maintain a signal-to-noise ratio of the desired signal above a threshold level at output of the gain control circuitry.

\* \* \* \* \*